(12) United States Patent
Miyazaki

(10) Patent No.: US 8,736,904 B2
(45) Date of Patent: May 27, 2014

(54) IMAGE FORMING SYSTEM

(75) Inventor: Ken Miyazaki, Sagamihara (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 344 days.

(21) Appl. No.: 13/291,235

(22) Filed: Nov. 8, 2011

(65) Prior Publication Data

US 2012/0120420 A1     May 17, 2012

(30) Foreign Application Priority Data

Nov. 11, 2010   (JP) ................ 2010-252406

(51) Int. Cl.
*H04N 1/60* (2006.01)
*G06K 1/00* (2006.01)

(52) U.S. Cl.
USPC .......... 358/1.9; 358/3.1; 358/1.15; 358/1.16; 358/519; 358/448; 399/27; 347/104

(58) Field of Classification Search
None
See application file for complete search history.

(56) References Cited

U.S. PATENT DOCUMENTS

2006/0209154 A1* 9/2006 Okabe et al. ................ 347/104
2009/0279907 A1* 11/2009 Tanaka et al. ................ 399/27

FOREIGN PATENT DOCUMENTS

| JP | 2005-027276 A | 1/2005 |
| JP | 2005-303701 A | 10/2005 |
| JP | 2007-104218 A | 4/2007 |
| JP | 4274031 B2 | 3/2009 |
| JP | 2009-300703 A | 12/2009 |

OTHER PUBLICATIONS

Japanese Office Action dated Feb. 25, 2014 (and English translation thereof) in counterpart Japanese Application No. 2010-252406.

* cited by examiner

*Primary Examiner* — Quang N Vo
(74) *Attorney, Agent, or Firm* — Holtz Holtz Goodman & Chick PC

(57) ABSTRACT

An image forming system includes: a plurality of image forming apparatus each having a storage section; a density conversion data registering section obtaining density conversion data composed of a combination of a voltage value and a density value as colorimetry results of a color sensor and an external colorimeter, respectively, and storing the data into the storage section of the apparatus which forms a density correcting chart to be used for the colorimetry; a paper setting section storing a tray paper profile or a paper profile into a paper setting storage section, with the profiles correlated with at least one piece of the data obtained by the density conversion data registering section; and a correction controlling section making the plurality of image forming apparatus perform printer γ correction based on the data correlated with the paper profile or the tray paper profile at a time of the image formation.

4 Claims, 41 Drawing Sheets

| LED CHARACTERISTICS | RED LED | GREEN LED | BLUE LED |
|---|---|---|---|
| LUMINOUS INTENSITY(mcd) | 5000~9300 | 1200~21000 | 4200~7200 |
| WAVELENGTH(nm) | 620~640 | 528~536 | 464~472 |
| DIRECTIONAL CHARACTERISTICS | 15° (±7.5°) | 15° (±7.5°) | 15° (±7.5°) |
| DETECTION OBJECT | C, K | M | Y |

FIG.5

| CLASSIFICATION | DETAILS | NUMBER OF γ CORRECTING PATCHES | NUMBER OF SHEETS OF PAPER |
|---|---|---|---|
| LARGE SIZE | (LENGTH OF SUB-SCANNING DIRECTION) ≥ 297.1mm | 32 | 3 |
| MEDIUM SIZE | (LENGTH OF SUB-SCANNING DIRECTION) = 210 - 297.0mm | 32 | 4 |
| SMALL SIZE | (LENGTH OF SUB-SCANNING DIRECTION) = 176 - 209.9mm | 32 | 6 |
| NOT APPLICABLE | (LENGTH OF SUB-SCANNING DIRECTION) ≤ 175.9mm OR (LENGTH OF MAIN SCANNING DIRECTION) ≤ 168mm | - | - |

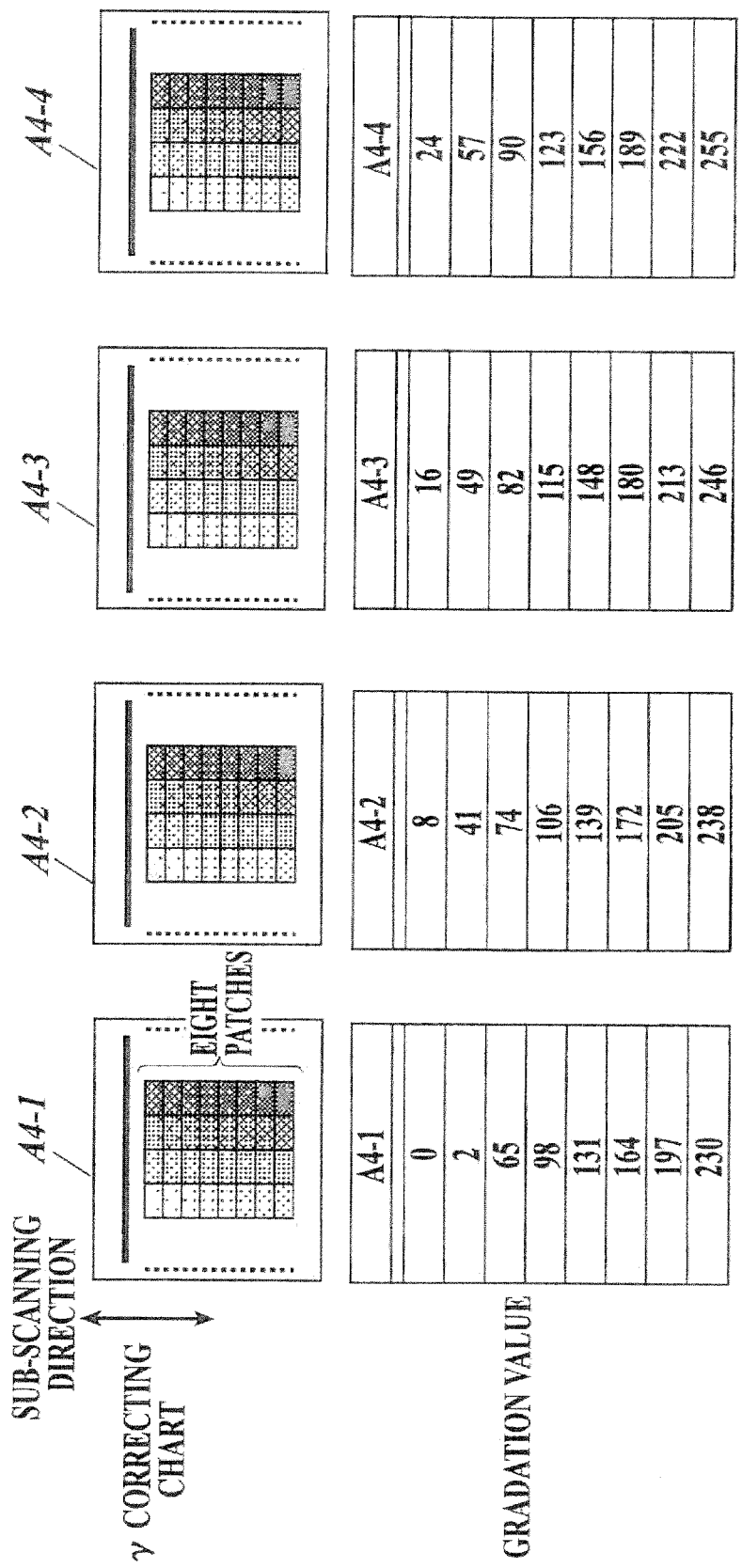

A11(A21)

| NO. | MEMBER |
|---|---|
| 1 | NAME |
| 2 | " |
| 3 | " |
| ⋮ | " |
| 10 | " |

A12(A22)

| NO. | MEMBER |
|---|---|
| 1 | REGISTRATION STATE<br>UPDATED DAY<br>DENSITY VALUE<br>PATCH COLORIMETRY VOLTAGE VALUE |
| 2 | " |
| 3 | " |
| ⋮ | " |
| 10 | " |

| TRAY PAPER PROFILE | | CONTENTS |
|---|---|---|
| TRAY NUMBER | MEMBER | |
| 1 | PAPER TYPE | |
| | PAPER NAME | |
| | BASIS WEIGHT UNIT | |
| | BASIS WEIGHT | |
| | EXISTENCE OF PUNCHED HOLE | |
| | REGISTRATION NUMBER | |
| | FRONT-BACK EXAMINING ACCURACY | |
| | SIZE SETTING | |
| | AIR BLOW | |
| | PROCESS CONDITION SETTING | |
| | PAPER ATTRIBUTE | |
| | LINK TO AMORPHOUS REGISTRATION DATABASE | |
| | SPEED SETTING | |
| | DELOMORPHOUS SIZE | |
| | THICKNESS | DEFAULT CORRECTING VALUE:1 |
| | INDIVIDUAL CURL REFORMING SETTING HUMIDIFICATION SETTING | PAPER CATEGORY:2 |
| | INDIVIDUAL CURL REFORMING SETTING REFORMING DIRECTION SETTING | OFF:0 |
| | PRINTER γ CORRECTION MODE | |
| | LINK TO PAPER CATEGORY DATABASE | ANY NUMBER AMONG REGISTRATION NUMBERS NO. 1-10 OF PAPER CATEGORIES |
| 2 | 〃 | |
| 3 | 〃 | |
| ⋮ | 〃 | |
| 9 | 〃 | |

| PAPER PROFILE | | CONTENTS |
|---|---|---|
| NO. | MEMBER | |
| 1 | PAPER TYPE | |
| | PAPER NAME | |
| | BASIS WEIGHT UNIT | |
| | BASIS WEIGHT | |
| | EXISTENCE OF PUNCHED HOLE | |
| | REGISTRATION NUMBER | |
| | FRONT-BACK EXAMINING ACCURACY | |
| | SIZE SETTING | |
| | AIR BLOW | |
| | PROCESS CONDITION SETTING | |
| | PAPER ATTRIBUTE | |
| | LINK TO AMORPHOUS REGISTRATION DATABASE | |
| | SPEED SETTING | |
| | DELOMORPHOUS SIZE | |
| | THICKNESS | DEFAULT CORRECTING VALUE:1 |
| | INDIVIDUAL CURL REFORMING SETTING HUMIDIFICATION SETTING | PAPER CATEGORY:2 |
| | INDIVIDUAL CURL REFORMING SETTING REFORMING DIRECTION SETTING | OFF : 0 |
| | PRINTER γ CORRECTION MODE | |
| | LINK TO PAPER CATEGORY DATABASE | ANY NUMBER AMONG REGISTRATION NUMBERS NO. 1-10 OF PAPER CATEGORIES |
| 2 | ″ | |
| 3 | ″ | |
| ⋮ | ″ | |
| 500 | ″ | |

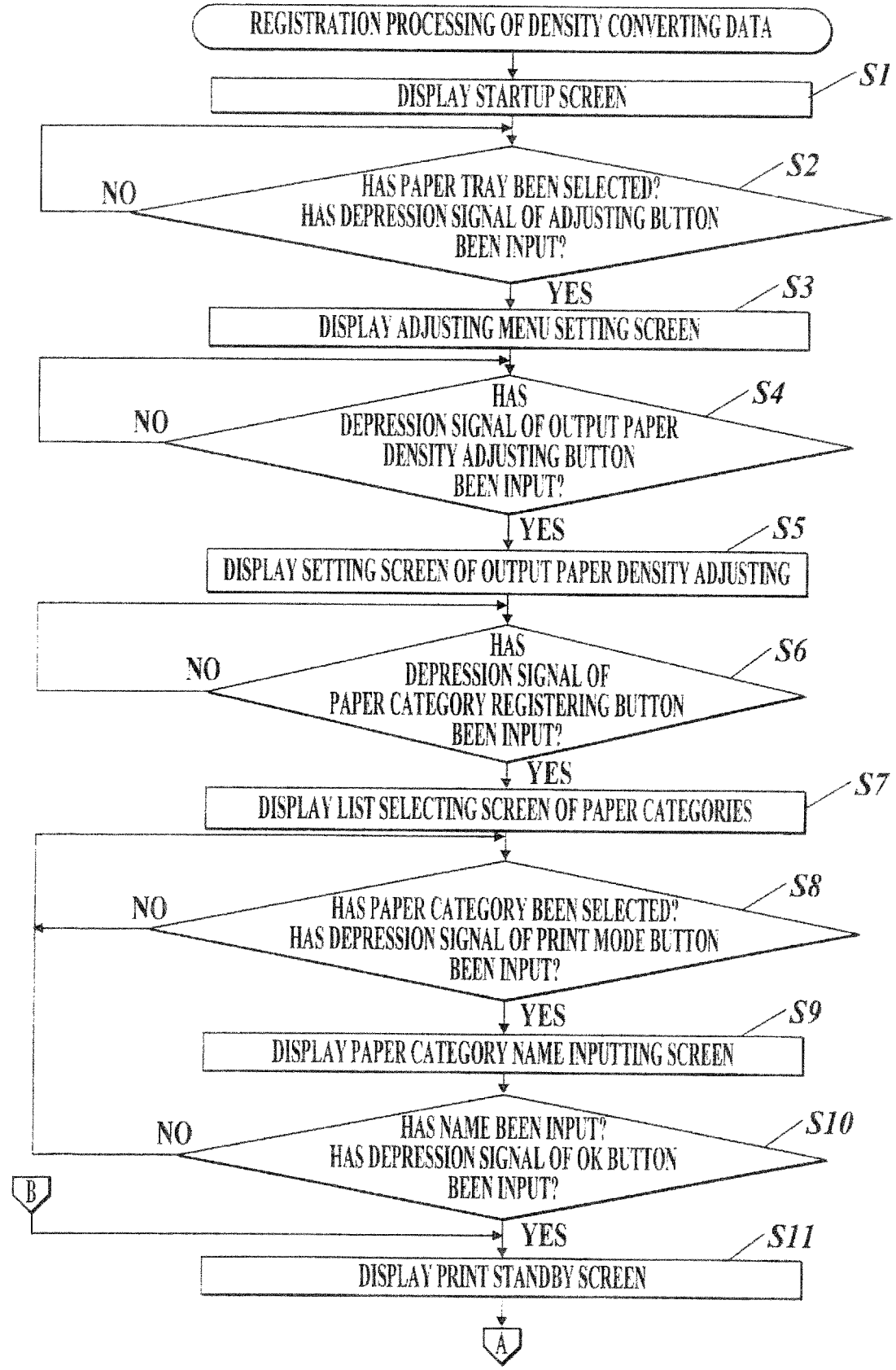

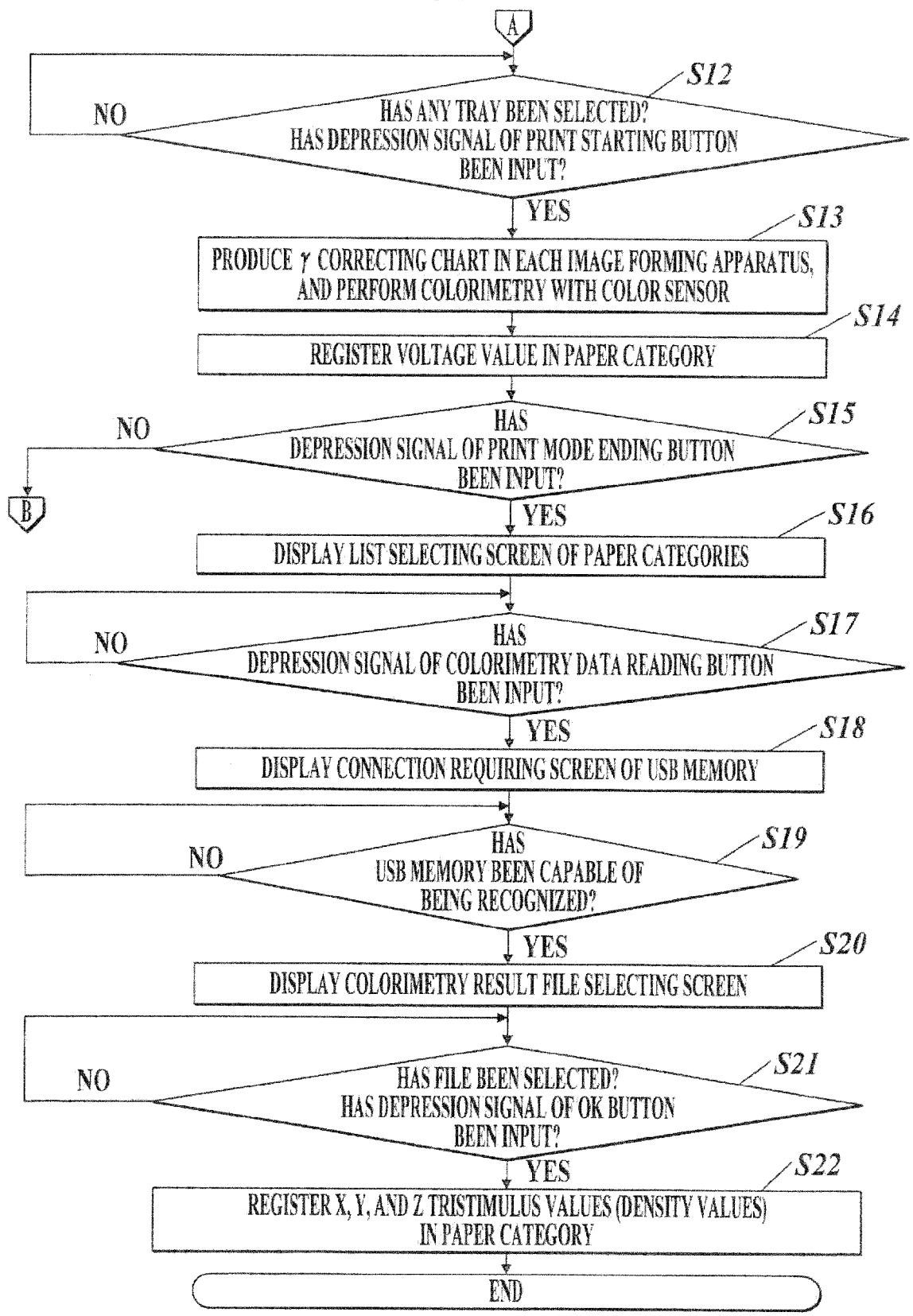

ADJUSTING

2009/08/28 13:39

PAPER CATEGORY REGISTERING

REGISTER DENSITY ADJUSTING VALUE ACCORDING TO PAPER

PAPER CATEGORY LIST

| No. | PAPER CATEGORY NAME<br>STATE OF WAITING FOR READING COLORIMETRY DATA | SETTING DATE |
|---|---|---|
| 01 | PaperType01 | |
| 02 | | |
| 03 | | |
| 04 | | |
| 05 | | |
| 06 | | |
| 07 | | |
| 08 | | |
| 09 | | |
| 10 | | |

COLORIMETRY DATA READING   DELETE

TO PRINT MODE   FRONT SCREEN

ADJUSTING

2009/08/28 13:40

G20

(i) PAPER CATEGORY REGISTERING
SELECT FILE

[Path] c:¥PRO_C8000¥exitpoll¥

COLORIMETRY RESULT FILE SELECTING

| FILE NAME | DATE | SIZE(byte) |
|---|---|---|
| 0113 | 2009/07/17 19:10 | 0 |
| 0113_hoge | 2009/07/17 19:10 | 0 |
| 0123 | 2009/07/17 19:10 | 0 |
| 0123_hoge | 2009/07/17 19:10 | 0 |
| 0133 | 2009/07/17 19:10 | 0 |
| 0133_hoge | 2009/07/17 19:10 | 0 |
| × 0141 | 2009/08/26 13:36 | 36517 |
| × 0142 | 2009/08/26 13:36 | 36938 |

1/2

× : UNAVAILABLE FILE

[FRONT SCREEN] [FRONT SCREEN]    [CANCEL] [OK]

FIG. 23

ADJUSTING  2009/08/28 13:43

ⓘ PAPER CATEGORY REGISTERING

REGISTER DENSITY ADJUSTING VALUE ACCORDING TO PAPER

PAPER CATEGORY LIST

| No. | PAPER CATEGORY NAME | SETTING DATE |
|---|---|---|
| 01 | PaperType01 | 2009/08/28 13:42 |
| 02 | | |
| 03 | | |
| 04 | | |
| 05 | | |
| 06 | | |
| 07 | | |
| 08 | | |
| 09 | | |
| 10 | | |

COLORIMETRY DATA READING    DELETE

TO PRINT MODE    FRONT SCREEN

MACHINE STATE | JOB LIST | HDD READING | COPYING | SCANNING | 2009/08/31 14:10
ORIGINAL COUNTER 0 | RESIDUAL QUANTITY OF MEMORY 98.400%
DEPRESSION OF [OK] SETTLES SETTINGS
DEPRESSION OF [CANCEL] ENABLES TO CANCEL SETTINGS
NUMBER OF RESERVED JOBS 0 | RESIDUAL QUANTITY OF FILE SYSTEMS 95.800%

PAPER SETTING ▷ INDIVIDUAL SETTING CHANGING
SET OUTPUT PAPER DENSITY ADJUSTING

| SETTINGS CHANGING | TRAY 1 |
| PAPER TYPE | PLAIN PAPER |
| PAPER PROFILE NAME | |
| PAPER SIZE | FIXED FORM SIZE |
| BASIS WEIGHT | 64-74g/m² |
| COLORED PAPER | WHITE COLOR |
| PUNCH | NO PUNCH HOLES |
| FRONT-BACK ADJUSTING | NO OFFSET CHANGING |
| CURL ADJUSTING | 0 HUMIDIFICATION :ON |
| THICKNESS | NO DESIGNATION |
| PROCESS ADJUSTING | NO OFFSET CHANGING |
| OUTPUT PAPER DENSITY ADJUSTING | OFF |

OUTPUT PAPER DENSITY ADJUSTING

DEFAULT CORRECTION VALUE
PAPER CATEGORY
OFF

WRITE GUIDANCE OF OUTPUT PAPER DENSITY ADJUSTING HERE

RESET    CANCEL    OK
PRINT DATA RECEIVABLE    MATERIALS    ROTATION OF IMAGE

FIG. 30

| No. | PAPER CATEGORY NAME | SETTING DATE | | | | | | |
|---|---|---|---|---|---|---|---|---|
| 01 | PaperType01 | 2009/08/28 13:42 | | | | | | |
| 02 | PaperType02 STATE OF WAITING FOR READING COLORIMETRY DATA | 2009/08/31 14:17 | | | | | | |
| 03 | | | | | | | | |
| 04 | | | | | | | | |
| 05 | | | | | | | | |
| 06 | | | | | | | | |
| 07 | | | | | | | | |
| 08 | | | | | | | | |
| 09 | | | | | | | | |
| 10 | | | | | | | | |

FIG.31

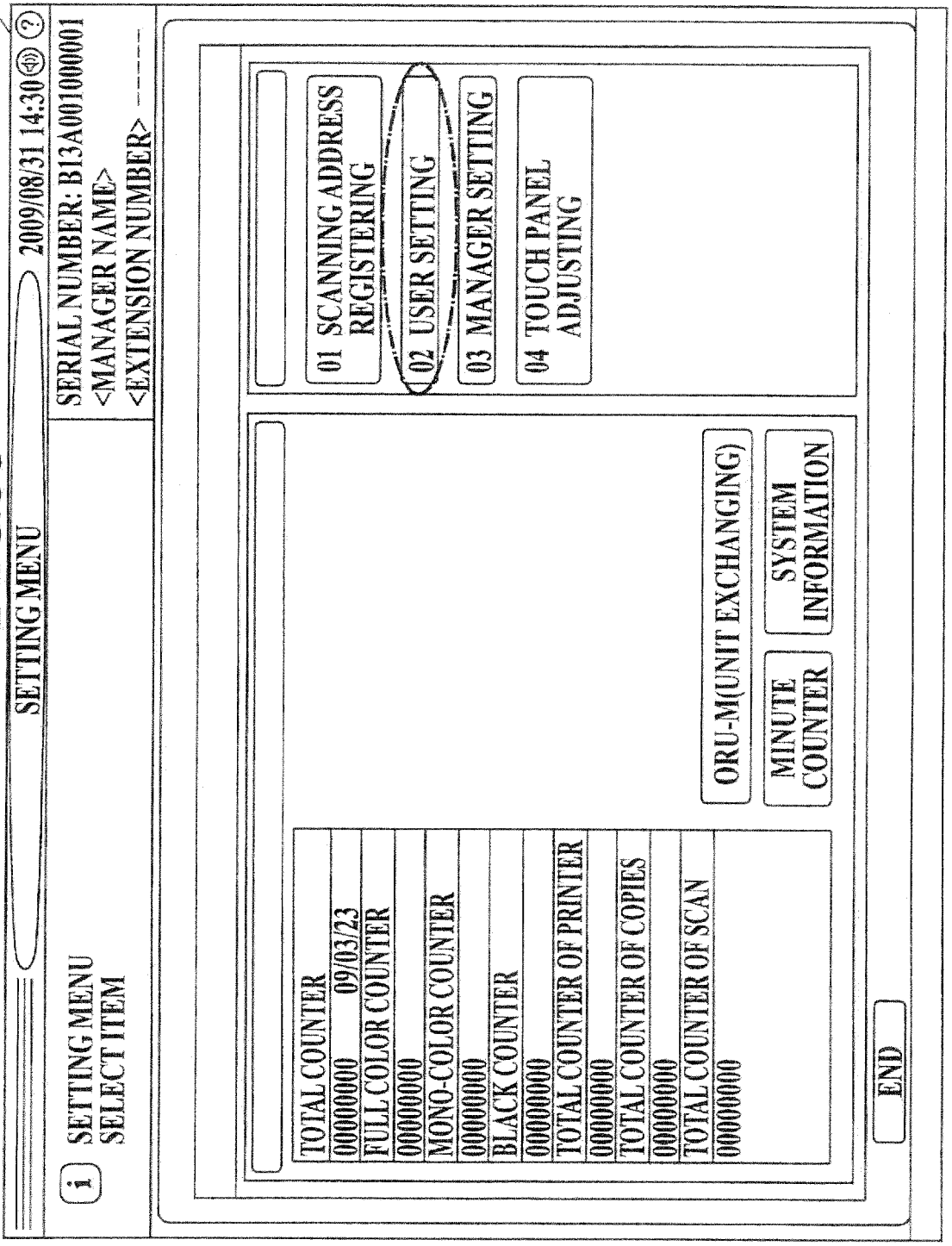

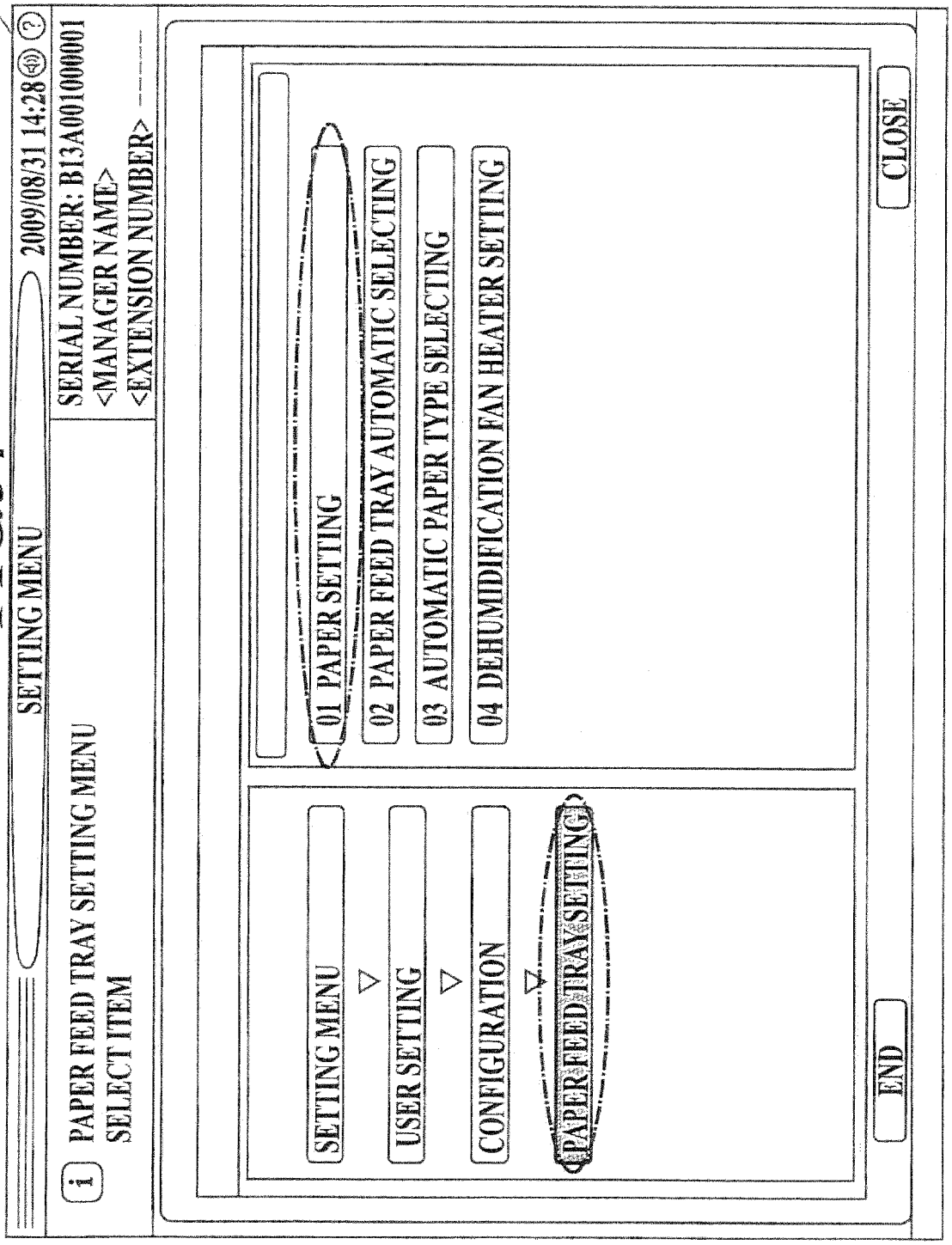

FIG.35

ADJUSTING

2009/08/28 14:29

SERIAL NUMBER: B13A0010000001
<MANAGER NAME>
<EXTENSION NUMBER>

ⓘ DEPRESSION OF [CLOSE] SETTLES SETTINGS AND ENDS OPERATION

PAPER CONDITION REGISTERING/DELETING

SELECT REGISTRATION DESTINATION/DEPRESSION OF [CLOSE] COMPLETES REGISTERING

PAPER CATEGORY LIST

| No. | PAPER PROFILE | PAPER SIZE | PAPER TYPE | BASIS WEIGHT | FRONT-BACK ADJUSTING | PROCESS |
|-----|---------------|------------|------------|--------------|----------------------|---------|
| 001 | | | | | | |
| 002 | | | | | | |
| 003 | | | | | | |
| 004 | | | | | | |
| 005 | | | | | | |
| 006 | | | | | | |
| 007 | | | | | | |
| 008 | | | | | | |
| 009 | | | | | | |
| 010 | | | | | | |

◁ 1/50 ▷

( ADDING / EDITING )  ( DELETE )

CLOSE

SETTING MENU

2009/08/31 14:46
SERIAL NUMBER: B13A001000001
<MANAGER NAME>
<EXTENSION NUMBER>

G44

ⓘ DEPRESSION OF [OK] SETTLES SETTINGS
DEPRESSION OF [CANCEL] ENABLES TO CANCEL SETTINGS

PAPER CONDITION REGISTERING
SET OUTPUT PAPER DENSITY ADJUSTING

| SETTINGS CHANGING | TRAY 1 |
|---|---|
| PAPER TYPE | PLAIN PAPER |
| PAPER PROFILE NAME | |
| PAPER SIZE | 11 × 17 |
| BASIS WEIGHT | 64-74g/m² |
| COLORED PAPER | WHITE COLOR |
| PUNCH | NO PUNCH HOLES |
| FRONT-BACK ADJUSTING | NO OFFSET CHANGING |
| CURL ADJUSTING | 0 HUMIDIFICATION :ON |
| AIR BLOW | AUTOMATIC |
| THICKNESS | NO DESIGNATION |
| PROCESS ADJUSTING | NO OFFSET CHANGING |
| OUTPUT PAPER DENSITY ADJUSTING | OFF |

OUTPUT PAPER DENSITY ADJUSTING

DEFAULT CORRECTION VALUE
PAPER CATEGORY
OFF

WRITE GUIDANCE OF OUTPUT PAPER DENSITY ADJUSTING HERE

RESET   CANCEL   OK

FIG.37

SETTING MENU    2009/08/31 14:37

ORIGINAL COUNTER 0    RESIDUAL QUANTITY OF MEMORY 98.400%
NUMBER OF RESERVED JOBS 0    RESIDUAL QUANTITY OF FILE SYSTEMS 95.800%

ⓘ DEPRESSION OF [OK] SETTLES SETTINGS
DEPRESSION OF [CANCEL] ENABLES TO CANCEL SETTINGS

PAPER CONDITION REGISTERING ▷ PAPER CATEGORY

PAPER CATEGORY LIST

| No. | PAPER CATEGORY NAME | SETTING DATE |
|-----|---------------------|--------------|
| 01 | PaperType01 | 2009/08/28 13:42 |
| 02 | PaperType02 STATE OF WAITING FOR READING COLORIMETRY DATA | 2009/08/31 14:12 |
| 03 | | |
| 04 | | |
| 05 | | |
| 06 | | |
| 07 | | |
| 08 | | |
| 09 | | |
| 10 | | |

CANCEL    OK

SETTING MENU — 2009/08/31 14:38
SERIAL NUMBER: B13A0010000001
<MANAGER NAME>
<EXTENSION NUMBER>

- DEPRESSION OF [OK] SETTLES SETTINGS
- DEPRESSION OF [CANCEL] ENABLES TO CANCEL SETTINGS

PAPER CONDITION REGISTERING
SET OUTPUT PAPER DENSITY ADJUSTING

| SETTINGS CHANGING | TRAY 1 |
|---|---|
| PAPER TYPE | PLAIN PAPER |
| PAPER PROFILE NAME | |
| PAPER SIZE | 11 × 17 |
| BASIS WEIGHT | 64-74g/m² |
| COLORED PAPER | WHITE COLOR |
| PUNCH | NO PUNCH HOLES |
| FRONT-BACK ADJUSTING | NO OFFSET CHANGING |
| CURL ADJUSTING | 0 HUMIDIFICATION :ON |
| AIR BLOW | AUTOMATIC |
| THICKNESS | NO DESIGNATION |
| PROCESS ADJUSTING | NO OFFSET CHANGING |
| OUTPUT PAPER DENSITY ADJUSTING | OFF |

OUTPUT PAPER DENSITY ADJUSTING

- DEFAULT CORRECTION VALUE
- PAPER CATEGORY
- OFF

WRITE GUIDANCE OF OUTPUT PAPER DENSITY ADJUSTING HERE

[RESET] [CANCEL] [OK]

| TRAY PAPER PROFILE | | CONTENTS |
|---|---|---|
| TRAY NUMBER | MEMBER | |
| 1 | PAPER TYPE | |
| | PAPER NAME | |
| | BASIS WEIGHT UNIT | |
| | BASIS WEIGHT | |
| | EXISTENCE OF PUNCHED HOLE | |
| | REGISTRATION NUMBER | |
| | FRONT-BACK EXAMINING ACCURACY | |
| | SIZE SETTING | |
| | AIR BLOW | |
| | PROCESS CONDITION SETTING | |
| | PAPER ATTRIBUTE | |
| | LINK TO AMORPHOUS REGISTRATION DATABASE | |
| | SPEED SETTING | |
| | DELOMORPHOUS SIZE | |
| | THICKNESS | PRINTER γ CORRECTION MODE ON MASTER SIDE |
| | INDIVIDUAL CURL REFORMING SETTING HUMIDIFICATION SETTING | PRINTER γ CORRECTION MODE ON SLAVE SIDE |
| | INDIVIDUAL CURL REFORMING SETTING REFORMING DIRECTION SETTING | |
| | PRINTER γ CORRECTION MODE | |
| | LINK TO PAPER CATEGORY DATABASE | ANY NUMBER AMONG REGISTRATION NUMBERS NO. 1-10 OF PAPER CATEGORIES ON MASTER SIDE |
| 2 | ″ | |
| 3 | ″ | |
| . . . | ″ | ANY NUMBER AMONG REGISTRATION NUMBERS NO. 1-10 OF PAPER CATEGORIES ON SLAVE SIDE |
| 9 | ″ | |

FIG. 40

| MACHINE STATE | JOB LIST | HDD READING | COPYING | SCANNING | 2009/08/31 17:00 |
|---|---|---|---|---|---|

ORIGINAL COUNTER 0 | RESIDUAL QUANTITY OF MEMORY 98.400%
NUMBER OF RESERVED JOBS 0 | RESIDUAL QUANTITY OF FILE SYSTEMS 95.800%

DEPRESSION OF [OK] SETTLES SETTINGS
DEPRESSION OF [CANCEL] ENABLES TO CANCEL SETTINGS

PAPER SETTING ▶ INDIVIDUAL SETTING CHANGING

SET OUTPUT PAPER DENSITY ADJUSTING

SETTINGS CHANGING — TRAY 1

| | |
|---|---|
| PAPER TYPE | PLAIN PAPER |
| PAPER PROFILE NAME | |
| PAPER SIZE | FIXED FORM SIZE |
| BASIS WEIGHT | 64-74g/m² |
| COLORED PAPER | WHITE COLOR |
| PUNCH | NO PUNCH HOLES |
| FRONT-BACK ADJUSTING | NO OFFSET CHANGING |
| CURL ADJUSTING | 0 HUMIDIFICATION :ON |
| THICKNESS | NO DESIGNATION |
| PROCESS ADJUSTING | NO OFFSET CHANGING |
| OUTPUT PAPER DENSITY ADJUSTING | OFF |

OUTPUT PAPER DENSITY ADJUSTING

| MASTER SIDE | SLAVE SIDE |
|---|---|
| DEFAULT CORRECTION VALUE | DEFAULT CORRECTION VALUE |
| PAPER CATEGORY | PAPER CATEGORY |
| OFF | OFF |

WRITE GUIDANCE OF OUTPUT PAPER DENSITY ADJUSTING HERE

RESET | CANCEL | OK
MATERIALS | ROTATION OF IMAGE

PRINT DATA RECEIVABLE

IMAGE FORMING SYSTEM

BACKGROUND OF THE INVENTION

1. Field of the Invention

The present invention relates to an image forming system.

2. Description of the Related Art

There has been performed a density correction in image processing of an image forming apparatus. The density correction includes, for example, printer γ correction.

The "printer γ correction" means adjusting the relative relation between an 'input value' such as the density or the luminance of an input image input into the image forming apparatus and an 'output value' such as the density of an image actually formed on a sheet of paper on the basis of the input image. The performance of the printer γ correction decreases the influences owing to the apparatus characteristics of image forming apparatus to enable the formation of an image having colors faithful to those of an input image on a sheet of paper. Incidentally, screen processing and the like can also be cited as influencing factors of the density correction besides the printer γ correction.

For example, Patent Document 1 discloses a technique of performing printer γ correction by using a scanner (see Patent Document 1: Japanese Patent Application Laid-Open Publication No. 2005-303701). To put it concretely, a γ correcting patch is formed on a sheet of paper, and the sheet of paper on which the γ correcting patch is formed is read by a scanner. The data of the original γ correcting patch and the data of the γ correcting patch read with the scanner are compared to each other, and the density data for canceling the difference is obtained. The disclosed technique performs the printer γ correction by using the density data for density correction.

Moreover, also the following technique has been known. That is, the technique provides an image density control (IDC) sensor in the neighborhood of the intermediate transfer belt in an image forming apparatus in place of using a scanner to read a γ correcting patch. The technique produces a density conversion table or a density conversion function for converting a voltage value of the IDC sensor into a density voltage on the basis of the voltage value obtained by reading a γ correcting patch formed on the intermediate transfer belt with the IDC sensor and density values such as X, Y, and Z tristimulus values obtained by reading the γ correcting patch with a colorimeter or the like, and produces a printer γ correction table, indicating a relation between input values and output values, by using the density conversion table to perform printer γ correction.

Moreover, for example, Patent Document 2 (Japanese Patent Publication No. 4274031) describes a technique based on the consideration of the fact that the density of an image actually formed on a sheet of paper includes differences of the color and the density of the paper to be a backing. That is, the technique forms a γ correcting patch on a sheet of object paper that is used by a user apart from a sheet of standard paper, and reads the γ correcting patch with a scanner to generate a target gradation characteristic according to the object paper, and then produces γ correcting density data by using the target gradation characteristic. Because a plurality of target gradation characteristics is registered by the technique of the Patent Document 2, the technique requires a user's operation of selecting the target gradation characteristic according to a sheet of object paper at the time of performing printing on the sheet of object paper.

Now, an image forming system (serial tandem system) composed of a plurality of image forming apparatus connected in a paper conveying direction has recently been proposed.

If the printer γ correction according to a sheet of object paper as described in Patent Document 2 is performed in such an image forming system, a user needs to perform the operation of selecting a target gradation characteristic according to the sheet of object paper in each of the image forming apparatus, thus the operations are troublesome and inconvenient.

SUMMARY OF THE INVENTION

It is an object of the present invention to resolve the troublesomeness of setting operations at the time of performing printer γ correction in an image forming system composed of a plurality of image forming apparatus connected in a paper conveying direction.

To achieve at least one of the abovementioned objects, according to one aspect of the present invention, there is provided an image forming system including: a plurality of image forming apparatus for forming an image on a sheet of paper, each of the plurality of image forming apparatus having a storage section and being connected with each other in a paper conveying direction; a color sensor for performing colorimetry on a density correcting chart formed on the sheet of paper by one of the plurality of image forming apparatus to output a voltage value as a colorimetry result; a taking-in section for taking in a density value as a colorimetry result of colorimetry performed by an external colorimeter on the density correcting chart; a plurality of paper feed trays; a density conversion data registering section for obtaining density conversion data composed of a combination of the voltage value and the density value based on the respective colorimetry results of the color sensor and the taking-in section, and storing the density conversion data into the storage section included in the image forming apparatus which forms the density correcting chart to be used for the colorimetry; a paper setting section for storing a tray paper profile representing set information of paper which is set in each of the paper feed trays, or a paper profile representing set information of each of the paper to be used in the image forming system, into a paper setting storage section, the tray paper profile or the paper profile being correlated with at least one piece of the density conversion data obtained by the density conversion data registering section; and a correction controlling section for making the plurality of image forming apparatus produce a density conversion table or a density conversion function for converting, at the respective plurality of image forming apparatus, the voltage value into the density value based on the density conversion data stored in the storage section included in the plurality of image forming apparatus, respectively, and making the plurality of image forming apparatus perform printer γ correction based on the density conversion table or the density conversion function produced by using the density conversion data correlated with the paper profile of the paper to be used for the image formation or the tray paper profile of the paper feed tray loaded with the paper, the paper profile and the tray paper profile being stored in the paper setting storage section, at a time of the image formation.

Preferably, the paper setting section makes the paper setting storage section store the density conversion data of the plurality of image forming apparatus, respectively, in a state of being correlated with the tray paper profile or the paper profile.

Preferably, the density conversion data registering section makes each of the plurality of image forming apparatus form the density correcting chart by using same type of paper and obtains the density conversion data as to all of the plurality of image forming apparatus, the density conversion data registering section gives identification information to each piece of the obtained density conversion data, the identification information indicating that the density conversion data is a set of data obtained by using the same type of paper, the density conversion data registering section makes the storage section of each of the image forming apparatus store the density conversion data with the identification information, and the paper setting section makes the paper setting storage section store the identification information of the set of pieces of density conversion data in a state of being correlated with the tray paper profile or the paper profile.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 is size specifications of a γ correcting chart;

FIG. 6 is a view showing examples of γ correcting charts;

FIG. 9 is a diagram showing the structure of a tray paper profile;

FIG. 10 is a diagram showing the structure of a paper profile;

FIG. 12 is a flow chart showing the registration processing of density conversion data;

FIG. 16 is a view showing a list selecting screen of paper categories;

FIG. 18 is a view showing a print standby screen;

FIG. 20 is a view showing a list selecting screen of paper categories;

FIG. 22 is a view showing a colorimetry result file selecting screen;

FIG. 23 is a view showing a list selecting screen of paper categories;

FIG. 27 is a view showing a startup screen;

FIG. 28 is a view showing a paper setting screen;

FIG. 29 is a view showing an individual setting changing screen;

FIG. 30 is a view showing a paper category selecting screen;

FIG. 31 is a view showing an individual setting changing screen to be displayed after paper category selection;

FIG. 33 is a view showing a setting menu screen;

FIG. 34 is a view showing a paper feed tray setting screen;

FIG. 35 is a view showing a paper profile registering screen;

FIG. 36 is a view showing a paper condition registering screen;

FIG. 37 is a view showing a paper category selecting screen to be displayed at the time of additional editing;

FIG. 38 is a view showing a paper condition registering screen to be displayed after paper category selection;

FIG. 39 is a diagram showing the structure of a tray paper profile of a modification; and FIG. 40 is a view showing an example of an individual setting screen and a paper condition registering screen of the modification.

DETAILED DESCRIPTION OF THE PREFERRED EMBODIMENTS

The image forming system in the present embodiment will minutely be described with reference to the accompanying drawings. The image forming system of the present embodiment is only an example of the present invention, and the present invention is not necessarily limited to this embodiment.

[Configuration of Image Processing Supporting System 100A]

First, a configuration of the image forming system will be described.

Figure 1:
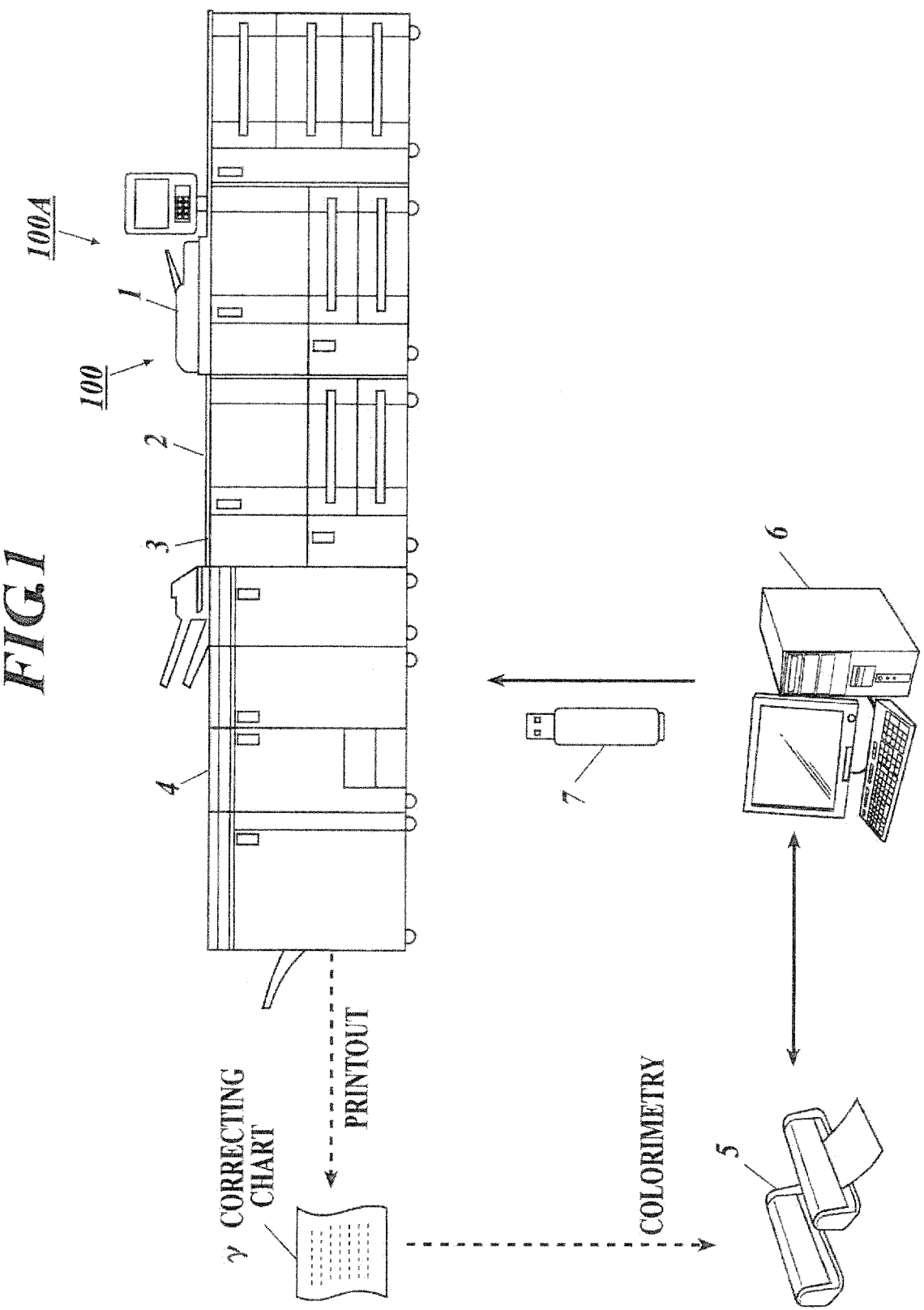
FIG. 1 is a schematic configuration diagram of an image processing supporting system.

FIG. 1 shows the schematic configuration of the image processing supporting system 100A.

As shown in FIG. 1, the image processing supporting system 100A is equipped with an image forming system 100, an X, Y, and Z tristimulus value colorimeter 5, an external personal computer (PC) 6, and a Universal Serial Bus (USB) memory 7. The image forming system 100 is equipped with a first image forming apparatus 1 (on the master side), a second image forming apparatus 2 (on the slave side), a relay unit (hereinafter referred to as RU) 3, and a post-processing apparatus 4. The image processing supporting system 100A is a system for performing output paper density adjusting of each of the image forming apparatus constituting the image forming system 100 (the first image forming apparatus 1 and the second image forming apparatus 2 here). The output paper density adjusting means to produce density conversion data to various types of paper in each of the image forming apparatus 1 and 2 in order to enable each of the image forming apparatus 1 and 2 to perform the optimum printer γ correction according to the type of a sheet of paper to be used.

Figure 2:
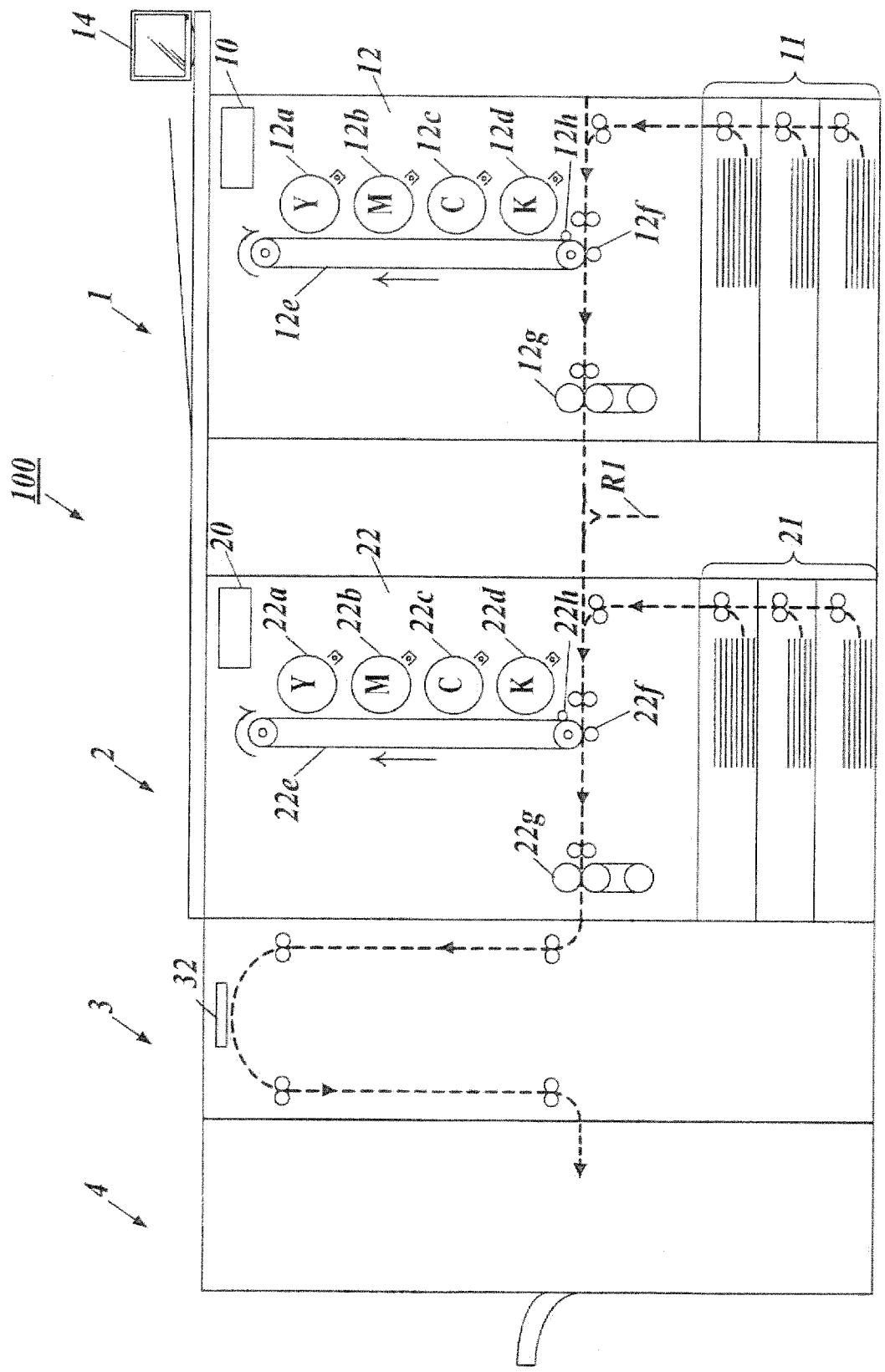
FIG. 2 is a schematic configuration diagram of an image forming system.

FIG. 2 shows the schematic configuration of the image forming system 100.

As shown in FIG. 2, the image forming system 100 is composed of the first image forming apparatus 1, the second image forming apparatus 2, the RU 3, and the post-processing apparatus 4, which are connected to each other in order. The arrows of dotted lines in FIG. 2 indicate conveyance pathways of sheets of paper. Although the case in which two image forming apparatus 1 and 2 are connected to each other is exemplified to be described in the present embodiment, the number of the image forming apparatus is not especially limited as long as the number is two or more.

The first image forming apparatus 1 is a digital printer of the electrophotographic printing system, and is composed of a control section 10, a paper feeding section 11, an image forming section 12, an operation displaying section 14, and the like. The image forming section 12 is composed of photosensitive drums 12a, 12b, 12c, and 12d of the colors of yellow (Y), magenta (M), cyan (C), and black (K), respectively, an intermediate transfer belt 12e, a transfer roller 12f, a fixing apparatus 12g, and the like. Although the image forming section 12 is composed of an automatic original conveying section, a scanner section, and the like besides the aforesaid components, their descriptions are omitted here. Moreover, an IDC sensor 12h is installed on the downstream side of the rotation direction of the intermediate transfer belt 12e.

Figure 4:
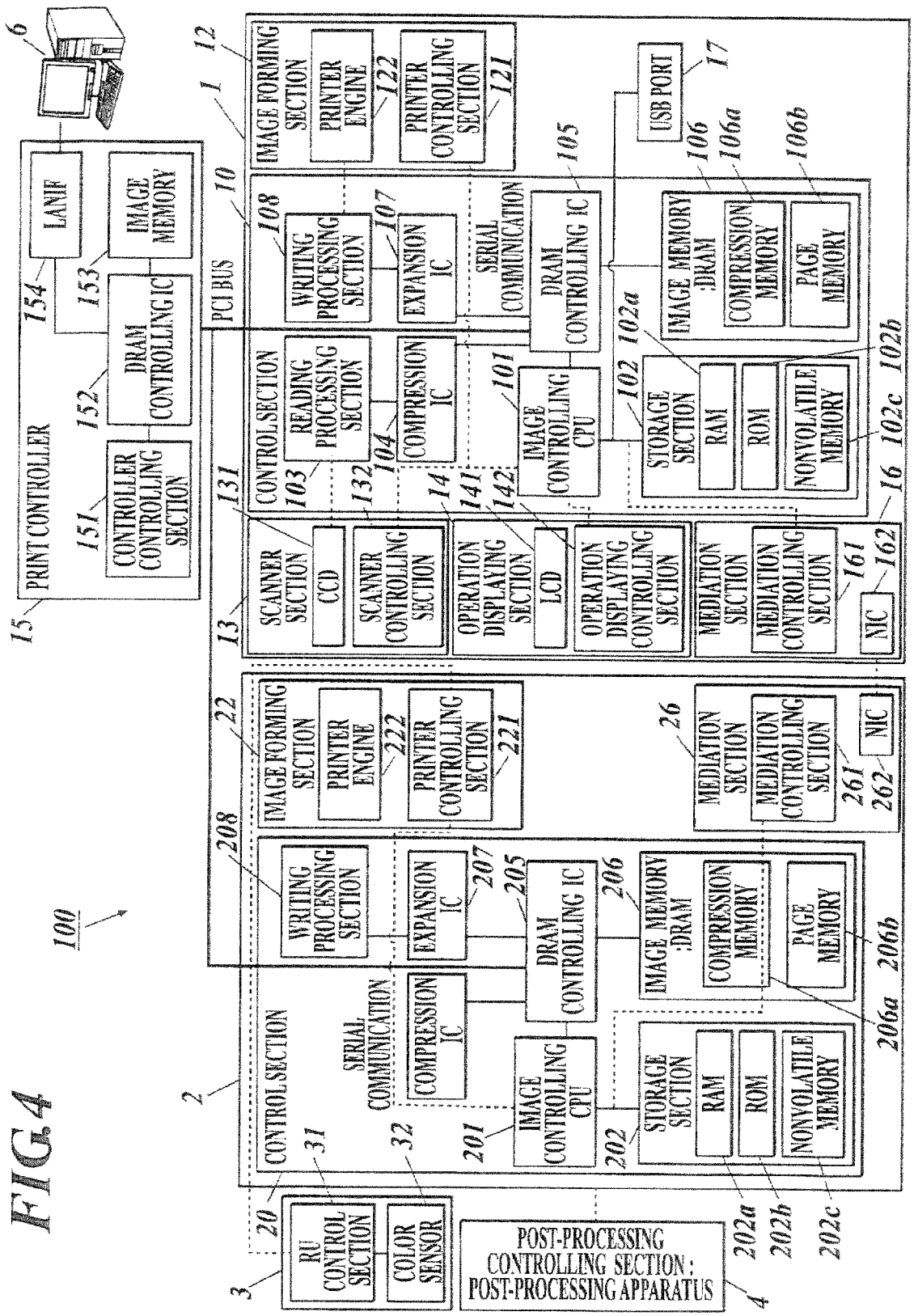
FIG. 4 is a functional block diagram of the image forming system.

The control section 10 is composed of an image controlling central processing unit (CPU) 101, a random access memory (RAM) 102a, a read only memory (ROM) 102b, a nonvolatile memory 102c, and the like (see FIG. 4). The image controlling CPU 101 of the control section 10 develops various programs stored in the ROM 102b or the nonvolatile memory 102c into the RAM 102a, and performs the integrated control of the operation of each section of the first image forming apparatus 1 in cooperation with the developed various programs.

The paper feeding section 11 is equipped with a plurality of paper feed trays. The paper feeding section 11 stores paper classified by paper types in the paper feed trays, and performs paper feeding by conveying the stored paper through predetermined conveyance paths.

The photosensitive drums 12a-12d of the respective colors Y, M, C, and K in the image forming section 12 forms the toner images of the colors Y, M, C, and K on the photosensitive drums 12a-12d, respectively, and carry the toner images on them. The photosensitive drums 12a-12d transfers the toner images onto the intermediate transfer belt 12e (primary transfer).

The intermediate transfer belt 12e rotates while carrying the toner images transferred to be formed thereon.

The transfer roller 12f transfers the toner images of the respective colors Y, M, C, and K carried on the intermediate transfer belt 12e onto a sheet of paper (secondary transfer).

The fixing apparatus 12g heats or pressurizes the toner images of the respective colors Y, M, C, and K transferred and formed on the sheet of paper to fix the toner images on the sheet of paper. The sheet of paper on which the toner images are fixed is conveyed to the second image forming apparatus 2 after that.

The operation displaying section 14 is composed of a liquid crystal display (LCD), a touch panel, and the like, and displays various setting screens. Moreover, when various buttons have been depressed by a user, the operation displaying section 14 generates a depression signal and outputs the generated depression signal to the image controlling CPU 101.

The second image forming apparatus 2 is a digital printer of the electrophotographic printing system, and is composed of a control section 20, a paper feeding section 21, an image forming section 22, and the like. Because the configuration of each of the components is similar to the one having the same name in the first image forming apparatus 1, the descriptions of the components of the first image forming apparatus 1 are quoted herein.

The RU 3 includes a color sensor 32. When the first image forming apparatus 1 and the second image forming apparatus 2 severally forms an image of a density correcting chart (hereinafter referred to a γ correcting chart) on a sheet of paper, the RU 3 reads the γ correcting charts with the color sensor 32, and outputs the information of the read voltage values to the image controlling CPU 101. Moreover, the RU 3 includes the function of synchronizing the conveyance speed of a sheet of paper conveyed from the image forming section 22 with that of the post-processing apparatus 4 besides the color sensor 32.

Figure 3:
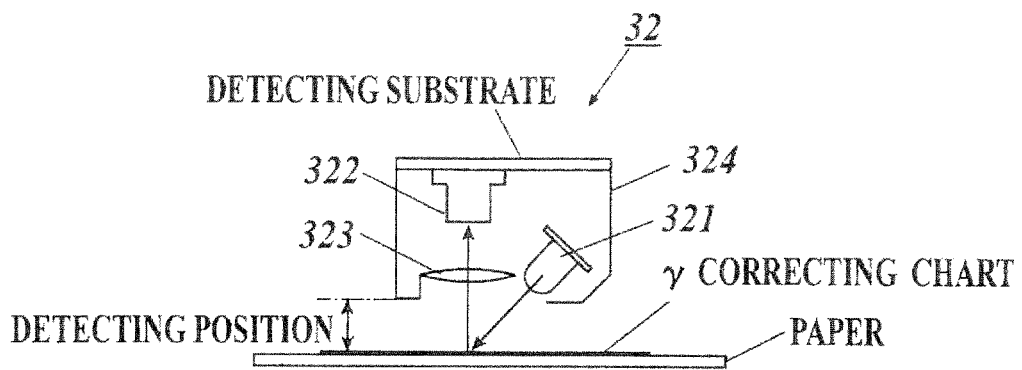
FIG. 3 is a schematic configuration diagram of a color sensor.

FIG. 3 shows the schematic configuration and the conditions of the color sensor 32.

The color sensor 32 is a reflection type sensor composed of a light emitting diode (LED) light source 321, a light receiving element 322, a lens 323, a lens holder 324, and the like.

The color sensor 32 performs the colorimetry of a chart (γ correcting chart in the present embodiment (see FIG. 6)) formed by being fixed on a sheet of paper, and outputs a voltage value calculated on the basis of the colorimetry to the image controlling CPU 101.

The post-processing apparatus 4 is an apparatus equipped with the functions capable of performing various kinds of post-processing, such as punching processing, folding processing, paste applying processing, and cutting processing, which function is the so-called finisher function.

Returning to FIG. 1, the X, Y, and Z tristimulus value colorimeter 5 includes a spectral photometer, and is connected to the external PC 6 by the USB connection. The X, Y, and Z tristimulus value colorimeter 5 reads a γ correcting chart formed on a sheet of paper, and converts the read γ correcting chart into X, Y, and Z tristimulus values. Moreover, the X, Y, and Z tristimulus value colorimeter 5 outputs the information of the converted X, Y, and Z tristimulus values to the external PC 6. Incidentally, although the present embodiment adopts the X, Y, and Z colorimetric system and is configured in such a way that the X, Y, and Z tristimulus values are obtained with the X, Y, and Z tristimulus value colorimeter 5, the colorimetric system is not limited to the X, Y, and Z colorimetric system. The present invention may adopts another colorimetric system and may be configured to obtain other color space coordinate values as density values with a color space coordinate value colorimeter.

The external PC 6 receives the input of the information of output X, Y, and Z tristimulus values, and stores the input information of the X, Y, and Z tristimulus values in the USB memory 7.

The USB memory 7 is extracted from the external PC 6 and is connected to the first image forming apparatus 1 to output the information of the X, Y, and Z tristimulus values to the image controlling CPU 101. Incidentally, the X, Y, and Z tristimulus value colorimeter 5, the external PC 6, and the first image forming apparatus 1 may always be connected to one another with local area network (LAN) cables or the like to be able to perform data communication.

The image controlling CPU 101 of the control section 10 receives the input of the information of the X, Y, and Z tristimulus values output from the USB memory 7, and produces a voltage density conversion table (hereinafter referred to as a density conversion table) or a voltage density conversion function for converting voltage values into X, Y, and Z tristimulus values (density values) on the basis of the information of the voltage values read with the color sensor 32 and the input X, Y, and Z tristimulus values and a predetermined algorithm. The image controlling CPU 101 produces a printer γ correcting table by using the produced density conversion table to perform printer γ correction at the time of image formation.

[Functional Configuration of Image Forming System 100]

FIG. 4 shows the functional block diagram of the image forming system 100.

The first image forming apparatus 1 is composed of the control section 10, the image forming section 12, a scanner section 13, the operation displaying section 14, a print controller 15, a mediation section 16, a USB port 17, and the like.

The control section 10 is composed of the image controlling CPU 101, a storage section 102, a reading processing section 103, a compression integrated circuit (IC) 104, a dynamic random-access memory (DRAM) controlling IC 105, an image memory 106, an expansion IC 107, a writing processing section 108, and the like.

The image controlling CPU 101 reads out various programs stored in the ROM 102b or the nonvolatile memory 102c of the storage section 102 to develop the read-out programs into the RAM 102a, and executes various kinds of processing in cooperation with the developed various programs.

The image controlling CPU 101 realizes a density conversion data registering section, a paper setting section, and a correction controlling section in cooperation with the programs stored in the ROM 102b or the nonvolatile memory 102c of the storage section 102.

The storage section 102 is composed of the RAM 102a, the ROM 102b, and the nonvolatile memory 102c.

The RAM 102a functions as a temporary storage area of a program, input or output data, a parameter, and the like that have been read out from the ROM 102b or the nonvolatile memory 102c in various kinds of processing that are executed and controlled by the image controlling CPU 101.

The ROM 102b stores a system program corresponding to the first image forming apparatus 1 and various programs capable of being executed on the system program. These programs are stored in the form of computer-readable program codes, and the image controlling CPU 101 sequentially executes the operations in conformity with these program codes. Moreover, the ROM 102b stores the data necessary for the execution of the programs.

The nonvolatile memory 102c will be described later.

The reading processing section 103 receives the input of an analog image signal output from the charge coupled device (CCD) 131, and performs the analog processing, the shading processing, the analog-to-digital (A/D) conversion processing, and the like to the input analog image signal to generate digital image data. The reading processing section 103 outputs the generated image data to the compression IC 104.

The compression IC 104 performs the compression processing of the image data output from the reading processing section 103, and after that, the compression IC 104 outputs the compressed image data to the DRAM controlling IC 105.

The DRAM controlling IC 105 makes the compression IC 104 compress the image data read by the reading processing section 103 and makes a compression memory 106a store the compressed image data.

Moreover, the DRAM controlling IC 105 reads out the compressed image data from the compression memory 106a and expands the read compressed image data with the expansion IC 107 to make a page memory 106b store the expanded uncompressed image data. Furthermore, the DRAM controlling IC 105 reads out the uncompressed image data stored in the page memory 106b to output the read uncompressed image data to the writing processing section 108.

The image memory 106 is composed of a DRAM and includes the compression memory 106a and the page memory 106b. The compression memory 106a stores compressed image data. Moreover, the page memory 106b temporarily stores the uncompressed image data being an image formation object before the image formation.

The expansion IC 107 performs expansion processing to input compressed image data.

The writing processing section 108 outputs the image data of an image formation object input from the DRAM controlling IC 105 to the image forming section 12.

The scanner section 13 is composed of the CCD 131 and a scanner controlling section 132 for controlling the drive of the CCD 131. The scanner section 13 performs the exposure scanning of an original surface placed on a not-shown original stand with a light source to receive a reflected light from the original surface, and the scanner section 13 performs the photoelectric conversion of the received reflected light with the CCD 131 to generate an analog image signal. The scanner section 13 outputs the generated analog image signal to the reading processing section 103.

The operation displaying section 14 is composed of an LCD 141, an operation displaying controlling section 142, and the like.

The LCD 141 is equipped with a touch panel covering the LCD 141. The operation displaying controlling section 142 receives the input of a display signal output from the image controlling CPU 101, and displays various setting screens and the like on the LCD 141 on the basis of the input display signal. Moreover, the operation displaying controlling section 142 receives the input of an operation signal generated by a depression of a not-shown operation key group or a touch panel, and outputs the input operation signal to the image controlling CPU 101.

The image forming section 12 is composed of a printer engine 122 and a printer controlling section 121 controlling the image formation operation of the printer engine 122. The printer engine 122 is composed of the photosensitive drums 12a-12d, the intermediate transfer belt 12e, the transfer roller 12f, the fixing apparatus 12g, which are shown in FIG. 2, and the like. The printer engine 122 forms toner images on a sheet of paper and performs a series of image formation processing for fixing the formed toner images.

The print controller 15 is composed of a controller controlling section 151, a DRAM controlling IC 152, an image memory 153, and a LAN interface (IF) 154.

The controller controlling section 151 collectively controls the operation of each section of the print controller 15.

The DRAM controlling IC 152 outputs the image data received through the LAN IF 154 and job setting information to the controller controlling section 151, and performs the control for temporarily storing the image data input from the controller controlling section 151 into the image memory 153 in conformity with an instruction from the controller controlling section 151. Moreover, the DRAM controlling IC 152 is connected to the DRAM controlling IC 105 of the first image forming apparatus 1 and the DRAM controlling IC 205 of the second image forming apparatus 2 through a peripheral components interconnect (PCI) bus. The DRAM controlling IC 152 outputs job setting information to the DRAM controlling IC 105 and reads out image data from the image memory 153 to output the read image data to the DRAM controlling IC 105 and the DRAM controlling IC 205 in conformity with instructions from the controller controlling section 151.

The image memory 153 is composed of a DRAM and temporarily stores image data.

The LAN IF 154 is a communication interface for connecting the print controller 15 with a network interface card (NIC), modem, and the like, and receives the image data transmitted from the external PC 6 through the LAN. Moreover, the LAN IF 154 outputs the received image data to the DRAM controlling IC 152.

The mediation section 16 is composed of a mediation controlling section 161, a NIC 162, and the like. The mediation section 16 performs the transmission and the reception of various pieces of information with a mediation section 26 of the second image forming apparatus 2.

The USB port 17 reads out various pieces of data stored in a USB memory to output the read data to the image controlling CPU 101. The USB port 17 functions as a taking-in section.

The second image forming apparatus 2 is composed of the control section 20, the image forming section 22, the mediation section 26, and the like. The processing of the respective sections of the second image forming apparatus 2 is similar to that of the sections having the same names as those of the first image forming apparatus 1, and accordingly the description of the processing is omitted here.

The RU 3 is composed of a RU control section 31, the color sensor 32, and the like.

The RU control section 31 is composed of a CPU, a RAM, a ROM, and the like. The RU control section 31 reads out the various programs stored in the ROM to develop the read various programs into the RAM, and the RU control section 31 executes various kinds of processing in cooperation with the developed various programs. Moreover, the RU control section 31 is connected to the image controlling CPU 101 through a printer controlling section 221, an image controlling CPU 201, and the mediation section 26 in a state capable of performing data communication.

The color sensor 32 reads the γ correcting chart formed on a sheet of paper passing on the sensor 32 and outputs the obtained voltage value to the RU control section 31.

Next, a γ correcting chart to be output for performing output paper density adjusting in each of the image forming apparatus (the first image forming apparatus 1 and the second image forming apparatus 2 here) constituting the image forming system 100, and a nonvolatile memory area secured for the output paper density adjusting will be described.

[γ Correcting Chart]

FIG. 5 shows the size specifications of γ correcting charts.

It is supposed that the settings of the size specifications of the γ correcting charts are previously stored in the nonvolatile memories 102c and 202c. Each of the γ correcting charts is composed of a plurality of γ correcting patches, which are formed over a plurality of sheets of paper. Incidentally, the sizes of the γ correcting patches are determined by the performance of the color sensor 32 and the like. Generally, the larger the paper size is, the smaller the necessary number of sheets of paper to be used for the γ correcting chart is; the smaller the paper size is, the larger the necessary number of sheets of paper is. The settings are here that the necessary numbers of sheets of paper for the γ correcting charts are associated to three patterns of paper sizes of a large size, a medium size, and a small size in total. For example, if a γ correcting chart is formed on a sheet of paper having the length of 297.0 mm (A4 paper) in the sub-scanning direction (paper conveying direction), the length indicates the "medium size." Consequently, "the number of γ correcting patches" is 32, and "the number of sheets of paper" is 4.

FIG. 6 shows examples of γ correcting charts.

The γ correcting chart shown in FIG. 6 is one formed on sheets of A4 paper. The γ correcting patches of each of the colors Y, M, C, and K are formed on the four sheets of A4 paper A4-1-A4-4 in total. Eight γ correcting patches are formed on each sheet of A4 paper, and 32 γ correcting patches are formed on the four sheets of A4 paper in total. The number of the γ correcting patches of the colors Y, M, C, and K is 32×4 colors=128 in total. The gradation values of the 7 correcting patches formed on the γ correcting charts A4-1-A4-4 are evenly dispersed over the γ correcting charts A4-1-A4-4 with a gradation 255 as the maximum as shown in FIG. 6. By dispersing the density evenly, the reproducibility of colors can be secured, and the reductions of chart dependency and noise can be achieved.

[Structure of Nonvolatile Memory]

Figure 7A:
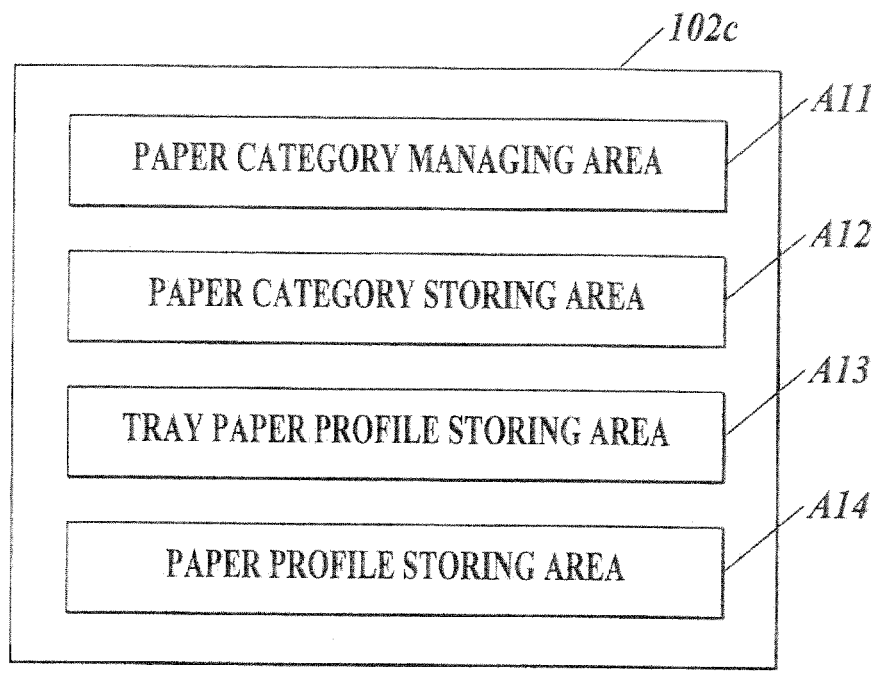
FIG. 7A is a diagram showing the data storing structure of the nonvolatile memory of a first image forming apparatus.

FIG. 7A shows the structure of the nonvolatile memory 102c in the first image forming apparatus 1. As shown in FIG. 7A, the nonvolatile memory 102c is provided with a paper category managing area A11, a paper category storing area A12, a tray paper profile storing area A13, and a paper profile storing area A14 as data storing areas for output paper density adjusting. The nonvolatile memory 102c functions as a storage section for storing density conversion data of the first image forming apparatus 1, and as a paper setting storage section.

Figure 8A:
FIG. 8A is a diagram showing the structure of the paper category managing area shown in FIG. 7A.

The paper category managing area A11 is an area for storing paper category managing information. As shown in FIG. 8A, the paper category managing area A11 stores 10 names (names of paper categories) of Nos. 1-10 in total as the paper category managing information.

The paper category storing area A12 is an area for storing paper categories for the first image forming apparatus 1.

The "paper category" means density conversion data for producing a density conversion table or a density conversion function that are used at the time of producing a γ correcting table to be used for printer γ correction. To put it concretely, a paper category is a combination of a voltage value indicating a result of the colorimetry of a γ correcting chart with the color sensor 32 and a density value indicating a result of the colorimetry of the same γ correcting chart with the X, Y, and Z tristimulus value colorimeter 5.

Figure 8B:
FIG. 8B is a diagram showing the structures of the paper category storing areas shown in FIGS. 7A and 7B.

As shown in FIG. 8B, the paper category storing area A12 of the present embodiment can store a maximum of ten paper categories of Nos. 1-10. Each of the paper categories includes a "registration state," an "updated day," a "density value," and a "patch colorimetry voltage value." The "registration state" is a piece of data of any of 0: unregistered, 1: waiting colorimetry data registration, and 2: registered. The "updated day" is a piece of data indicating an updated day of the paper category. The "density value" is X, Y, and Z tristimulus values (density values) indicating a result of the colorimetry of a γ correcting chart formed as an image with the first image forming apparatus 1 by the X, Y, and Z tristimulus value colorimeter 5. The "patch colorimetry voltage value" is a voltage value indicating a result of the colorimetry of a γ correcting chart formed as an image with the first image forming apparatus 1 by the color sensor 32.

Incidentally, the name of a paper category registered at a time of registration processing of density conversion data, which will be described later, the paper categories pertaining to the first image forming apparatus 1, and the paper categories pertaining to the second image forming apparatus 2 are denoted by the same registration number and are correlated with one another. Thereby, the name and the paper categories are managed as a set of pieces of information obtain by using the same type of paper. For example, the paper category which No. 1 is given to and is stored in the nonvolatile memory 102c (202c) of each of the image forming apparatus 1 and 2 is managed as the paper category of the same type of paper having the "name" of the paper category managing information of No. 1.

The tray paper profile storing area A13 is an area for storing tray paper profiles. The tray paper profiles are pieces of set information of the pieces of paper set in the respective paper feed trays provided to the paper feeding sections (the paper feeding section 11 and the paper feeding section 21) of the image forming system 100. The tray paper profile storing area A13 has an area capable of storing tray paper profiles for the number of the paper feed trays included in the image forming system 100. As shown in FIG. 9, the tray paper profile storing area A13 is configured to be able to store a maximum of nine tray paper profile settings of Nos. 1-9 in the present embodiment.

The tray paper profile includes each data of "paper type," "paper name," "basis weight unit," "basis weight," ..., "printer γ correction mode," and "link of paper category database" as shown in FIG. 9. As to the "printer γ correction mode," any of "default correcting value": 1, "paper category": 2, and "OFF": 0 is registered. The "default correcting value" is a mode of producing a density conversion table or a density conversion function by using predetermined default density conversion data. The "paper category" is a mode of producing a density conversion table or a density conversion function by using the paper category registered in the registration processing of density conversion data, which will be described later, as density conversion data. The "OFF" is a mode of producing a density conversion table or a density conversion function by using the density conversion data obtained by using the IDC sensor 12h without performing any output paper density adjusting. As to the "link of paper category database," any registration number among the registration numbers Nos. 1-10 of the paper categories (see FIGS. 8A and 8B) is registered. By the registration of the number, the tray paper profile is linked (correlated) with the paper category of the registered number.

The paper profile storing area A14 is an area for storing paper profiles. The paper profiles are pieces of set information of the respective types of paper to be used in the image forming system 100. The paper profile storing area A14 has an area capable of storing a maximum of 500 paper profile settings of Nos. 1-500 in the present embodiment.

The paper profile has the same data configuration as that of the tray paper profile as shown in FIG. 10. Similarly to the tray paper profile, as to the "printer γ correction mode," any of the "default correcting value": 1, the "paper category": 2, and the "OFF": 0 is registered. As to the "link of paper category database," any number of the registration numbers of Nos. 1-10 (see FIGS. 8A and 8B) of the paper categories is registered. By the registration of the number, the paper profile is linked (correlated) with the paper category of the registered number.

Figure 7B:
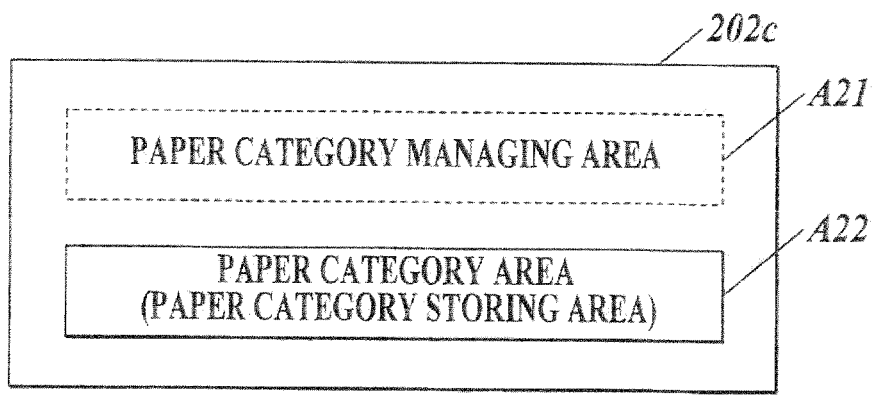
FIG. 7B is a diagram showing the data storing structure of the nonvolatile memory of a second image forming apparatus.

FIG. 7B shows the structure of the nonvolatile memory 202c in the second image forming apparatus 2. As shown in FIG. 7B, a paper category managing area A21 and a paper category storing area A22 are formed in the nonvolatile memory 202c as data storing areas for output paper density adjusting. The nonvolatile memory 202c functions as a storage section for storing the density conversion data pertaining to the second image forming apparatus 2. Incidentally, the paper category managing area A21 is an area for storing paper category managing information similarly to the paper category managing area A11, but the paper category managing area A21 is not used ordinarily.

The paper category storing area A22 is an area for storing the paper categories for the second image forming apparatus 2. The data configuration of the paper categories stored in the paper category storing area A22 is similar to that stored in the paper category storing area A12 shown in FIG. 8B. However, the "density value" is each of the X, Y, and Z tristimulus values (density values) showing the results of the performance of colorimetry of a γ correcting chart formed as an image by the second image forming apparatus 2 with the X, Y, and Z tristimulus value colorimeter 5. The "patch colorimetry voltage value" is a voltage value indicating a result of the performance of the colorimetry of a γ correcting charge formed as an image by the second image forming apparatus 2 with the color sensor 32.

Moreover, each of the nonvolatile memories 102c and 202c stores the image data of the aforesaid γ correcting charts, size specifications, default density conversion data, the density conversion data by the IDC sensors 12h and 22h, and the like, although they are not shown.

Figure 11:
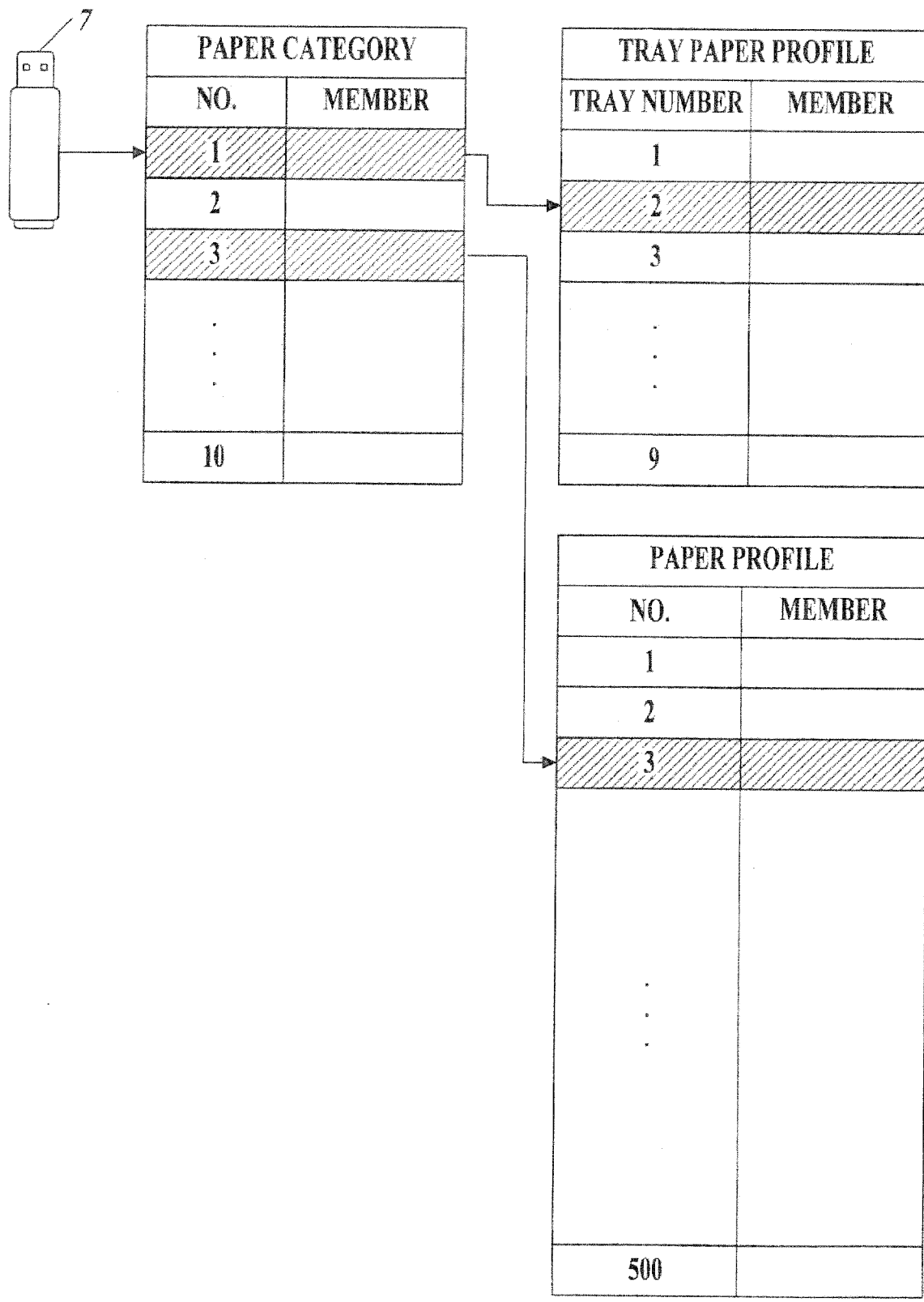
FIG. 11 is a diagram showing mutual relations among the paper categories, tray paper profiles, and paper profiles.

FIG. 11 shows the mutual relations among paper categories, tray paper profiles, and paper profiles. It is supposed as the premise that the USB memory 7 has been inserted into the USB port 17 and the information of the X, Y, and Z tristimulus values stored in the USB memory 7 has been output to the image controlling CPU 101 of the control section 10.

When the X, Y, and Z tristimulus values as the results of the colorimetry of the γ correcting charts formed as images in the respective first and second image forming apparatus 1 and 2, which tristimulus values have been stored in the USB memory 7, has been input into the image controlling CPU 101, the image controlling CPU 101 registers the input X, Y, and Z tristimulus values into the areas having the same registration number (No. 1 in FIG. 11) of the paper category storing areas A12 and A22.

The tray paper profiles and the paper profiles can be linked to the paper categories. In the example of FIG. 11, the tray paper profile of the tray number 2 is shown to be linked with the paper category of No. 1. Moreover, the paper profile of the paper number 3 is shown to be linked with the paper category of No. 3. For example, if a user designates the paper feed tray of the tray number 2 to perform printing, printer γ correction is performed on the basis of the density conversion table or the density conversion function that has been produced by using the density conversion data of the paper category of No. 1, which is linked with the tray paper profile of the tray number 2. If the user does not designate any trays and designates the type of paper corresponding to the paper number 3 to perform printing, or if the user designates the paper profile of the paper number 3 to perform printing, the tray paper profile of the paper feed tray loaded with the paper of the paper type of the paper number 3 is updated to the contents of the paper profile of the paper number 3, and the printer γ correction is performed on the basis of the density conversion table or the density conversion function that has produced by using the density conversion data of the paper category of No. 3 linked with the paper profile of the paper number 3.

That is, if a user wants to perform the optimum printer γ correction to each pieces of paper to be actually used, the user sets a "paper category" as the printer γ correction mode to the tray paper profile or the paper profile of a sheet of paper to be used, and the user forms a link of the produced paper category by using the paper to be used in advance. Thereby, the optimum printer γ correction can be performed without any operations at the time of performing the printer γ correction.

[Registration Processing of Density Conversion Data]

The registration processing of density conversion data (paper category) will be described with reference to FIG. 12. The registration processing of density conversion data is executed by the image controlling CPU 101 in cooperation with the programs stored in the storage section 102. By the execution of the registration processing of density conversion data, a density conversion data registering section is realized.

First, the image controlling CPU 101 displays a startup screen in the operation displaying section 14 (Step S1).

Figure 13:
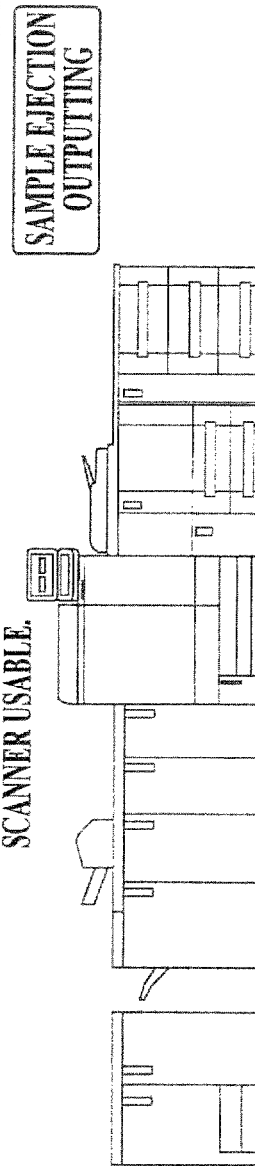
FIG. 13 is a view showing a startup screen.

FIG. 13 shows the startup screen G11.

Paper trays (paper feed trays) of tray numbers 1-9 are displayed on the right side of the screen G11 in the state capable of being selected. Moreover, an "adjusting" button is displayed on the lower side of the screen G11 in the state of being depressible.

The image controlling CPU 101 judges whether or not the image controlling CPU 101 has received the input of the depression signal that has generated when a paper tray has been selected and the "adjusting" button has been depressed on the startup screen G11 (Step S2).

If the image controlling CPU 101 has not received the input of the depression signal of the "adjusting" button (Step S2: NO), the image controlling CPU 101 continues to display the startup screen G11.

If the image controlling CPU 101 has received the input of the depression signal of the "adjusting" button (Step S2: YES), the image controlling CPU 101 displays an adjusting menu setting screen in the operation displaying section 14 (Step S3).

Figure 14:
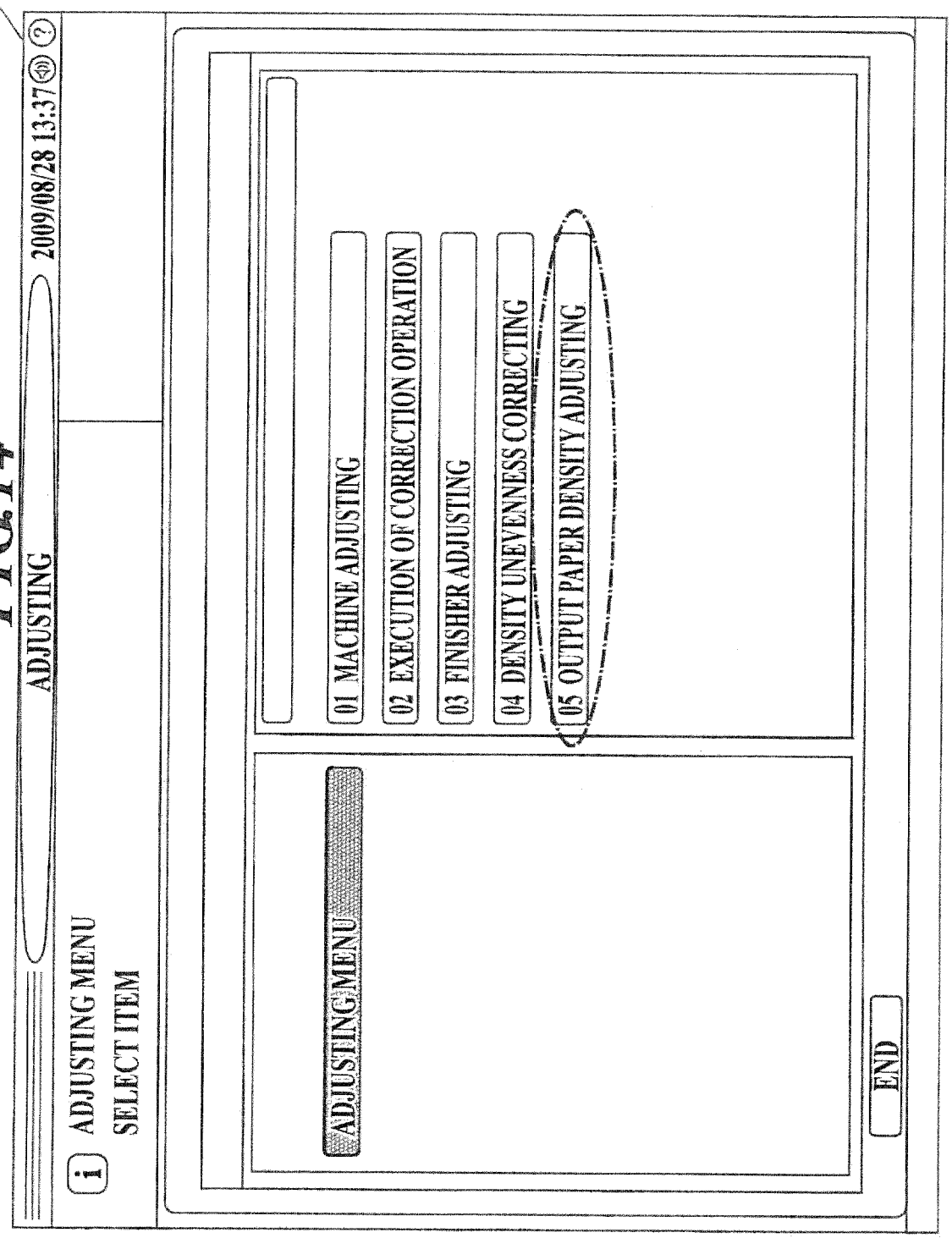
FIG. 14 is a view showing an adjusting menu setting screen.

FIG. 14 shows the setting screen G12 of the adjusting menu.

An "output paper density adjusting" button is displayed on the right side of the screen G12 in the state of being depressible.

The image controlling CPU 101 judges whether or not the image controlling CPU 101 has received the input of the depression signal that has been generated when the "output paper density adjusting" button has been depressed on the setting screen G12 of the adjusting menu (Step S4).

If the image controlling CPU 101 has not received the input of the depression signal of the "output paper density adjusting" button (Step S4: NO), the image controlling CPU 101 continues to display the setting screen G12 of the adjusting menu.

If the image controlling CPU 101 has received the input of the depression signal of the "output paper density adjusting" button (Step S4: YES), the image controlling CPU 101 displays a setting screen of output paper density adjusting in the operation displaying section 14 (Step S5).

Figure 15:
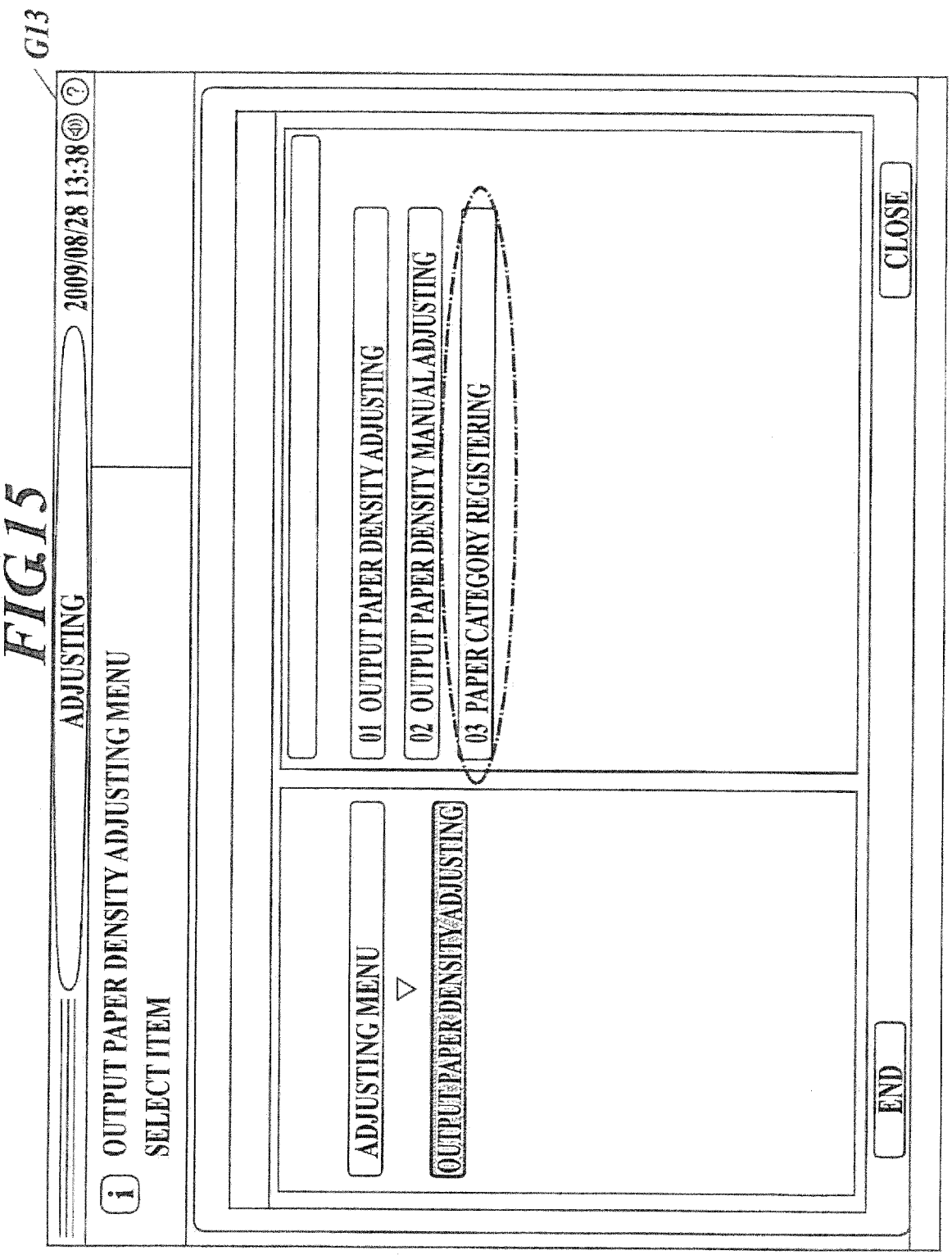
FIG. 15 is a view showing a setting screen of an output paper density adjusting.

FIG. 15 shows the setting screen G13 of the output paper density adjusting.

The state of the movement from the setting screen G12 of the adjusting menu to the setting screen G13 of the output paper density adjusting is displayed on the left side of the screen G13.

A "paper category registering" button is displayed on the right side of the screen G13 in the state of being depressible.

The image controlling CPU 101 judges whether or not the image controlling CPU 101 has received the input of the depression signal that has been generated when the "paper category registering" button has been depressed on the setting screen G13 of the output paper density adjusting (Step S6).

If the image controlling CPU 101 has not received the input of the depression signal of the "paper category registering" button (Step S6: NO), the image controlling CPU 101 continues to display the setting screen G13 of the output paper density adjusting.

If the image controlling CPU 101 has received the input of the depression signal of the "paper category registering" button (Step S6: YES), the image controlling CPU 101 displays a list selecting screen of paper categories in the operation displaying section 14 (Step S7).

Figure 16:
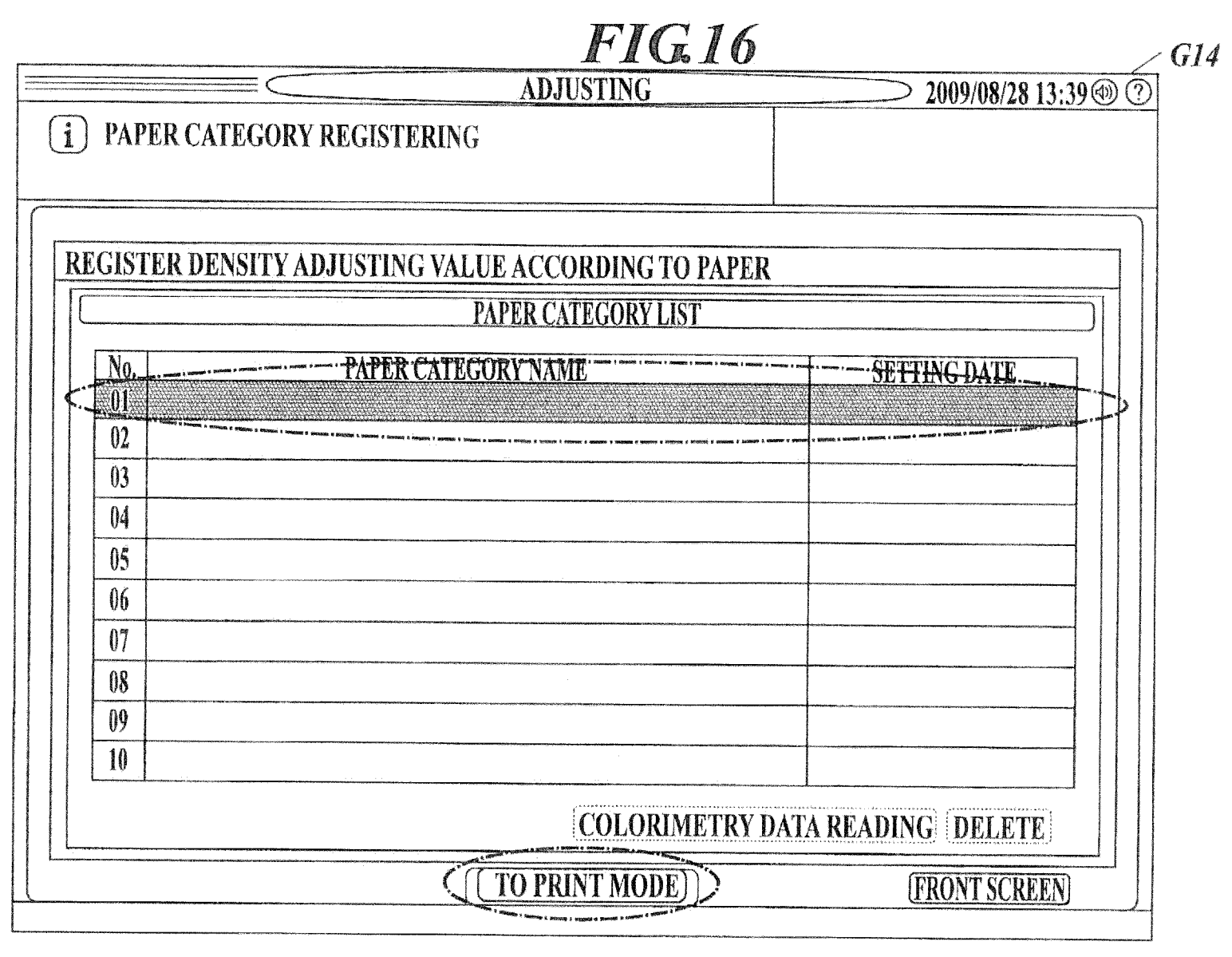

FIG. 16 shows the list selecting screen G14 of the paper categories.

10 names of paper categories or blank areas when there are no names of Nos. 1-10 are displayed in total on the list selecting screen G14 in the state of being selectable. Moreover, a "print mode" button is displayed on the lower side of the screen G14 in the state of being depressible.

The image controlling CPU 101 judges whether or not the image controlling CPU 101 has received the input of the depression signal that has been generated when any one of paper categories among the names Nos. 1-10 has been selected and the "print mode" button has been depressed on the list selecting screen G14 of the paper categories (Step S8).

If the image controlling CPU 101 has not received the input of the depression signal of the "print mode" button (Step S8: NO), the image controlling CPU 101 continues to display the list selecting screen G14 of the paper categories.

If the image controlling CPU 101 has received the input of the depression signal of the "print mode" button (Step S8: YES), the image controlling CPU 101 displays a paper category name inputting screen in the operation displaying section 14 (Step S9).

Figure 17:
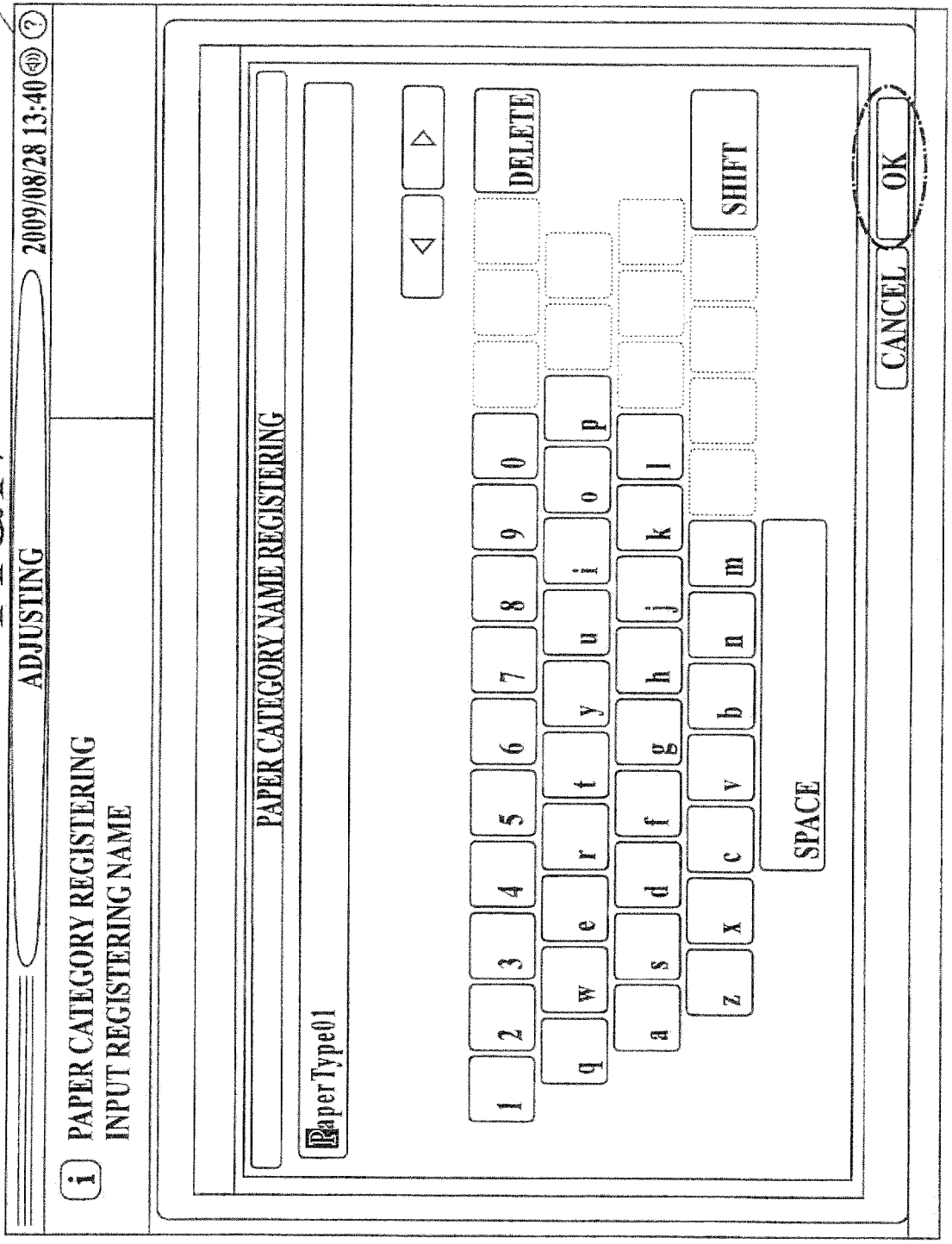
FIG. 17 is a view showing a paper category name inputting screen.

FIG. 17 shows a paper category name inputting screen G15.

A keyboard is displayed on the paper category name inputting screen G15 in the state of being depressible. Moreover, an "OK" button is displayed on the lower side of the screen G15 in the state of being depressible.

The image controlling CPU 101 judges whether or not the image controlling CPU 101 has received the input of the depression signal that has been generated when a name has been input and the "OK" button has been depressed on the paper category name inputting screen G15 (Step S10).

If the image controlling CPU 101 has not received the input of the depression signal of the "OK" button (Step S10: NO), the image controlling CPU 101 continues to display the list selecting screen G14 of the paper categories.

If the image controlling CPU 101 has received the input of the depression signal of the "OK" button (Step S10: YES), the image controlling CPU 101 displays a print standby screen in the operation displaying section 14 (Step S11).

Figure 18:
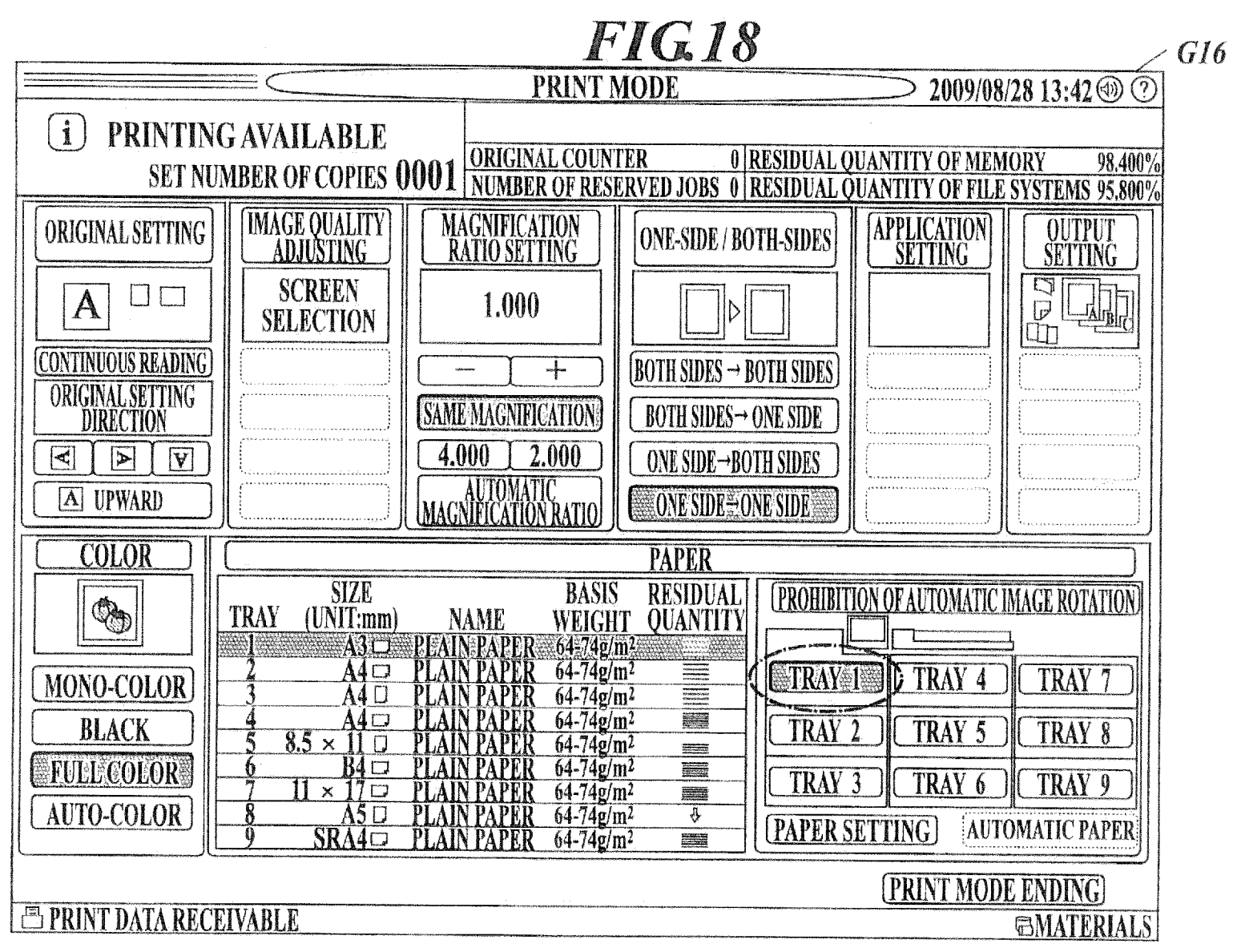

FIG. 18 shows the print standby screen G16.

9 trays of trays 1-9 are displayed in total on the lower right side of the screen G16 in the state of being selectable. Density conversion data will subsequently be registered in the tray paper profile of the tray selected here.

The image controlling CPU 101 judges whether or not the image controlling CPU 101 has received the input of the depression signal that has been generated when any of the trays 1-9 has been selected and a print starting button (not shown) has been depressed on the print standby screen G16 (Step S12).

If the image controlling CPU 101 has not received the input of the depression signal of the print starting button (Step S12: NO), the image controlling CPU 101 continues to display the print standby screen G16.

If the image controlling CPU 101 has received the input of the depression signal of the print starting button (Step S12: YES), the image controlling CPU 101 displays a printing screen in the operation displaying section 14, and the image controlling CPU 101 sequentially feed sheets of paper from the selected tray to make the image forming sections 12 and 22 of all the image forming apparatus 1 and 2 connected to the image forming system 100 perform the image formation of γ correcting charts thereon. Then, the image controlling CPU 101 makes the RU 3 perform their colorimetry (Step S13).

Figure 19:
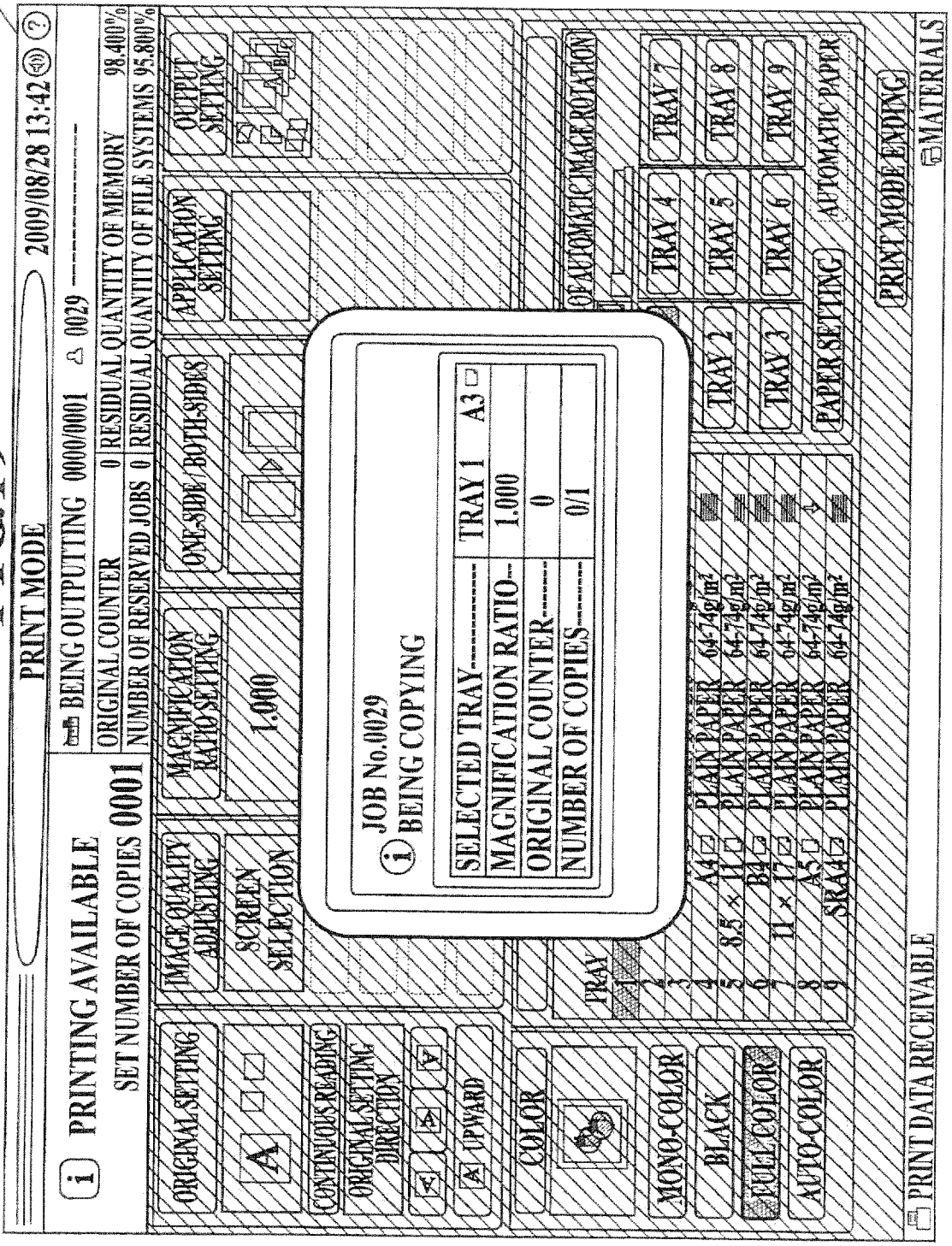
FIG. 19 is a view showing a printing screen.

FIG. 19 shows the printing screen G17.

Messages such as "being copying" are displayed on the printing screen G17.

After displaying the printing screen G17, the image controlling CPU 101 concretely performs the following control. That is, because the first and the second image forming apparatus 1 and 2 are connected to the image forming system 100 of the present embodiment, at Step S13, the image controlling CPU 101 first performs the paper feeding from the selected tray, and makes the image forming section 12 of the first image forming apparatus 1 form a γ correcting chart on the fed sheet of paper. Then, the image controlling CPU 101 conveys the sheet of paper on which the image of the γ correcting chart has been formed to the RU 3, and makes the color sensor 32 perform the colorimetry thereof. Next, the image controlling CPU 101 feeds a sheet of paper from the selected tray, and makes the image forming section 22 of the second image forming apparatus 2 form an image of a γ correcting chart on the fed sheet of paper. Then, the image controlling CPU 101 conveys the sheet of paper on which the γ correcting chart has been formed to the RU 3, and makes the color sensor 32 perform the colorimetry thereof.

After the completion of the production and the colorimetry of the γ correcting charts in all the image forming apparatus 1 and 2, the image controlling CPU 101 changes the printing screen G17 displayed in the operation displaying section 14 to the print standby screen G16, and registers the colorimetry values (voltage values) of the γ correcting charts the colorimetry of which has been performed with the color sensor 32 in paper categories (Step S14). To put it concretely, the image controlling CPU 101 writes the names input from the name inputting screen G15 at Step S9 into the areas of the Nos. of the paper categories of the paper category managing area A11, which Nos. have been selected at Step S7, as the names of paper categories to be registered. The image controlling CPU 101 then writes the colorimetry values of the γ correcting charts produced by the image forming section 12 into the "patch colorimetry voltage value" areas of the Nos. of the paper categories in the paper category storing area A12, which No. has been selected at Step S7. The image controlling CPU 101 further stores the colorimetry values of the γ correcting charts produced by the image forming section 22 in the "patch colorimetry voltage value" areas of the Nos. of the paper categories in the paper category storing area A22, which Nos. have been selected at Step S7.

Next, the image controlling CPU 101 judges whether or not the image controlling CPU 101 has received the input of the depression signal that has been generated when the "print mode ending" button has been depressed on the print standby screen G16 (see FIG. 18) (Step S15).

If the image controlling CPU 101 has not received the input of the depression signal of the "print mode ending" button (Step S15: NO), the image controlling CPU 101 continues to display the print standby screen G16.

If the image controlling CPU 101 has received the input of the depression signal of the "print mode ending" button (Step S15: YES), the image controlling CPU 101 displays a list selecting screen of paper categories in the operation displaying section 14 (Step S16).

FIG. 20 shows the list selecting screen G18 of the paper categories.

The display contents and the configuration of the list selecting screen G18 are the same as those of the list selecting screen G14. Here, because the voltage value of a γ correcting chart read by the color sensor 32 has been registered in a paper category, the name is displayed in one area of the paper category list. Moreover a message such as "The system is in the state of waiting for the reading of colorimetry data." is displayed in combination with the name.

A "colorimetry data reading" button is displayed on the lower side of the screen G18. The "colorimetry data reading" button is displayed in a half-tone dot meshed state, that is, in an un-depressible state, at the beginning. However, if a paper category has been selected in the paper category list, and if the paper category is in a colorimetry data registration waiting state, that is, if the paper category is one into which the voltage value of a γ correcting chart has been registered in the processing step at the preceding stage and no X, Y, and Z tristimulus values are registered, then the half-tone dot meshing is released by the control of the image controlling CPU 101, and the "colorimetry data reading" button is displayed in a depressible state. By such control of the "colorimetry data reading" button to be depressible only when the voltage value of a γ correcting chart has been registered in the processing step at the preceding stage and no X, Y, and Z tristimulus values are registered, it can be prevented that a paper category having no voltage values and a paper category of a different type of paper are selected.

When the system 100 is in the state of waiting for the reading of colorimetry data, a user performs the colorimetry of each of the γ correcting charts produced by the first and the second image forming apparatus 1 and 2 with the X, Y, and Z tristimulus value colorimeter 5. After the X, Y, and Z tristimulus value colorimeter 5 has performed the colorimetry, the X, Y, and Z tristimulus value colorimeter 5 outputs the information of the X, Y, and Z tristimulus values of the colorimetry results to the external PC 6. The external PC 6 writes the information of the X, Y, and Z tristimulus values input from the X, Y, and Z tristimulus value colorimeter 5 into the USB memory 7. After the colorimetry, the user depresses the "colorimetry data reading" button of the list selecting screen G18. Incidentally, the external PC 6 can give the identification information of the image forming apparatus that has produced the read γ correcting chart to the information of the X, Y, and Z tristimulus values input from the X, Y, and Z tristimulus value colorimeter 5.

The image controlling CPU 101 judges whether or not the image controlling CPU 101 has received the input of the depression signal that has been generated when the "colorimetry data reading" button has been depressed on the list selecting screen G18 (Step S17).

If the image controlling CPU 101 has not received the input of the depression signal of the "colorimetry data reading" button (Step S17: NO), the image controlling CPU 101 continues to display the list selecting screen G18.

If the image controlling CPU 101 has received the input of the depression signal of the "colorimetry data reading" button (Step S17: YES), the image controlling CPU 101 displays a connection requiring screen of the USB memory 7 in the operation displaying section 14 (Step S18).

Figure 21:
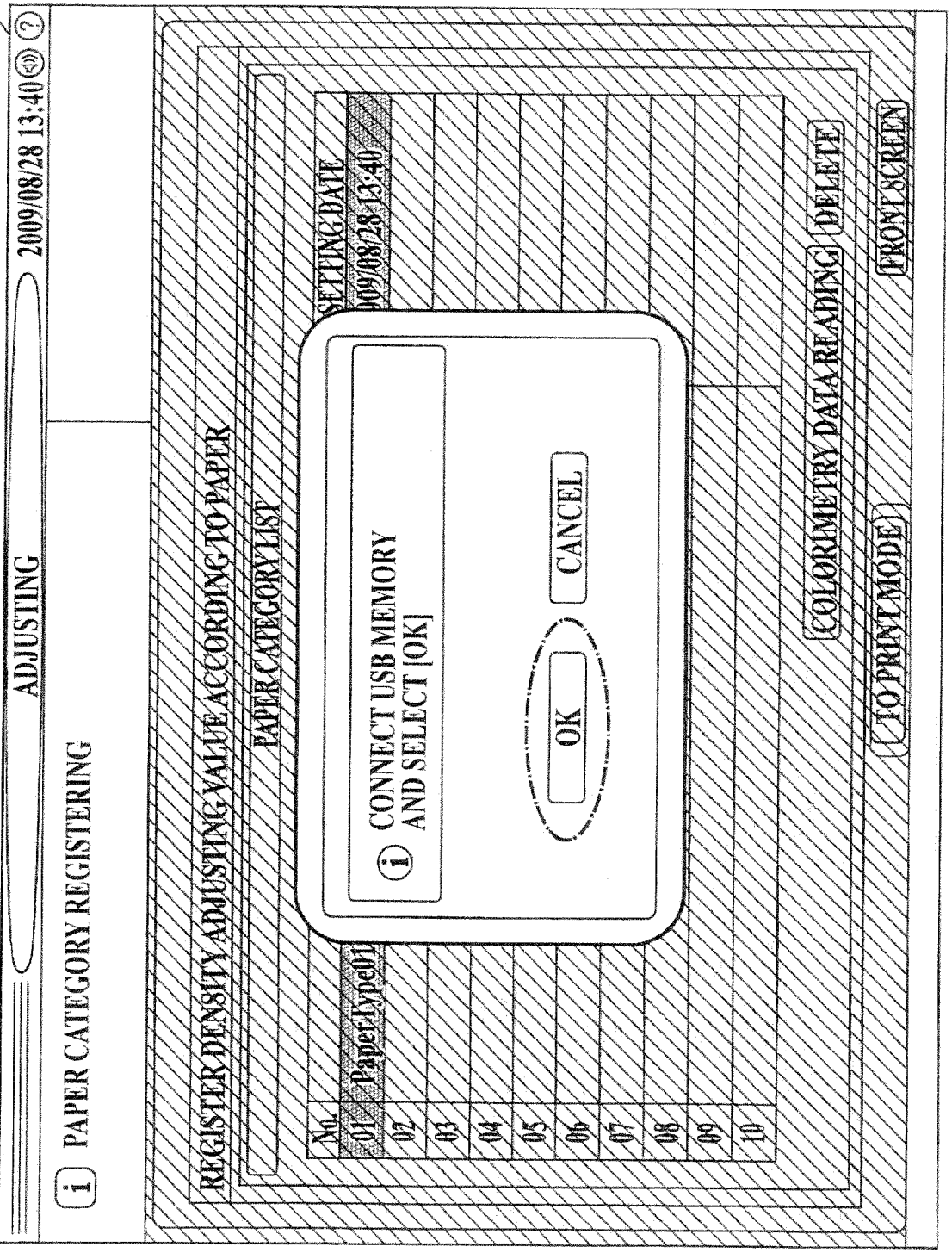
FIG. 21 is a view showing a connection requiring screen.

FIG. 21 shows a connection requiring screen G19.

A message such as "Connect a USB memory and select the OK." is displayed on the connection requiring screen G19. Moreover, the "OK" button is displayed in the state of being depressible.

When the image controlling CPU 101 has received the input of the depression signal that has been generated if the "OK" button has been depressed, the image controlling CPU 101 judges whether or not the image controlling CPU 101 has been able to recognized the USB memory 7 (Step S19).

If the image controlling CPU 101 has not been able to recognize the USB memory 7 (Step S19: NO), the image controlling CPU 101 displays a message such as "No USB memories could be recognized." on a screen having the similar configuration to that of the connection requiring screen G19.

If the image controlling CPU 101 has been able to recognize the USB memory 7 (Step S19: YES), the image controlling CPU 101 displays a colorimetry result file selecting screen in the operation displaying section 14 (Step S20).

FIG. 22 shows the colorimetry result file selecting screen G20.

File names (X, Y, and Z tristimulus values) of the colorimetry results that are stored in the USB memory 7 are displayed on the file selecting screen G20 in the state of being selectable. An "OK" button is displayed in the state of being depressible on the lower side of the screen G20.

The image controlling CPU 101 judges whether or not the image controlling CPU 101 has received the input of the depression signal that has been generated when a file has been selected and the "OK" button has been depressed on the file selecting screen G20 (Step S21).

If the image controlling CPU 101 has not received the input of the depression signal of the "OK" button (Step S21: NO), the image controlling CPU 101 continues to display the file selecting screen G20.

If the image controlling CPU 101 has received the input of the depression signal of the "OK" button (Step S21: YES), the image controlling CPU 101 registers the selected file in the "density value" of the paper category (Step S22). To put it concretely, the image controlling CPU 101 writes the file selected on the file selecting screen G20 into the area of the "density value" of the No. of the paper category selected on the list selecting screen G18 of the paper category storing area A12 or A22. The image controlling CPU 101 writes (stores) the colorimetry results of the γ correcting charts formed by the first image forming apparatus 1 into the paper category storing area A12, and the image controlling CPU 101 writes (stores) the colorimetry results of the γ correcting charts formed by the second image forming apparatus 2 into the paper category storing area A22. The image controlling CPU 101 judges which of the areas A12 and A22 the image controlling CPU 101 writes a colorimetry result into, for example, on the basis of the identification information of the image forming apparatus 1 or 2, which information is given on the file.

When the registration has ended, the image controlling CPU 101 ends the registration processing of the density conversion data.

FIG. 23 shows a list selecting screen G21 of paper categories after the density conversion data, that is, the paper category, has been registered.

The configuration and the contents of the list selecting screen G21 are same as those of the list selecting screen G18. Here, because the density conversion data has been registered as the paper category, the message such as the "The system is in the state of waiting for the reading of colorimetry data." in one area of the paper category list is deleted, and only the name of the paper category is displayed.

Figure 24:
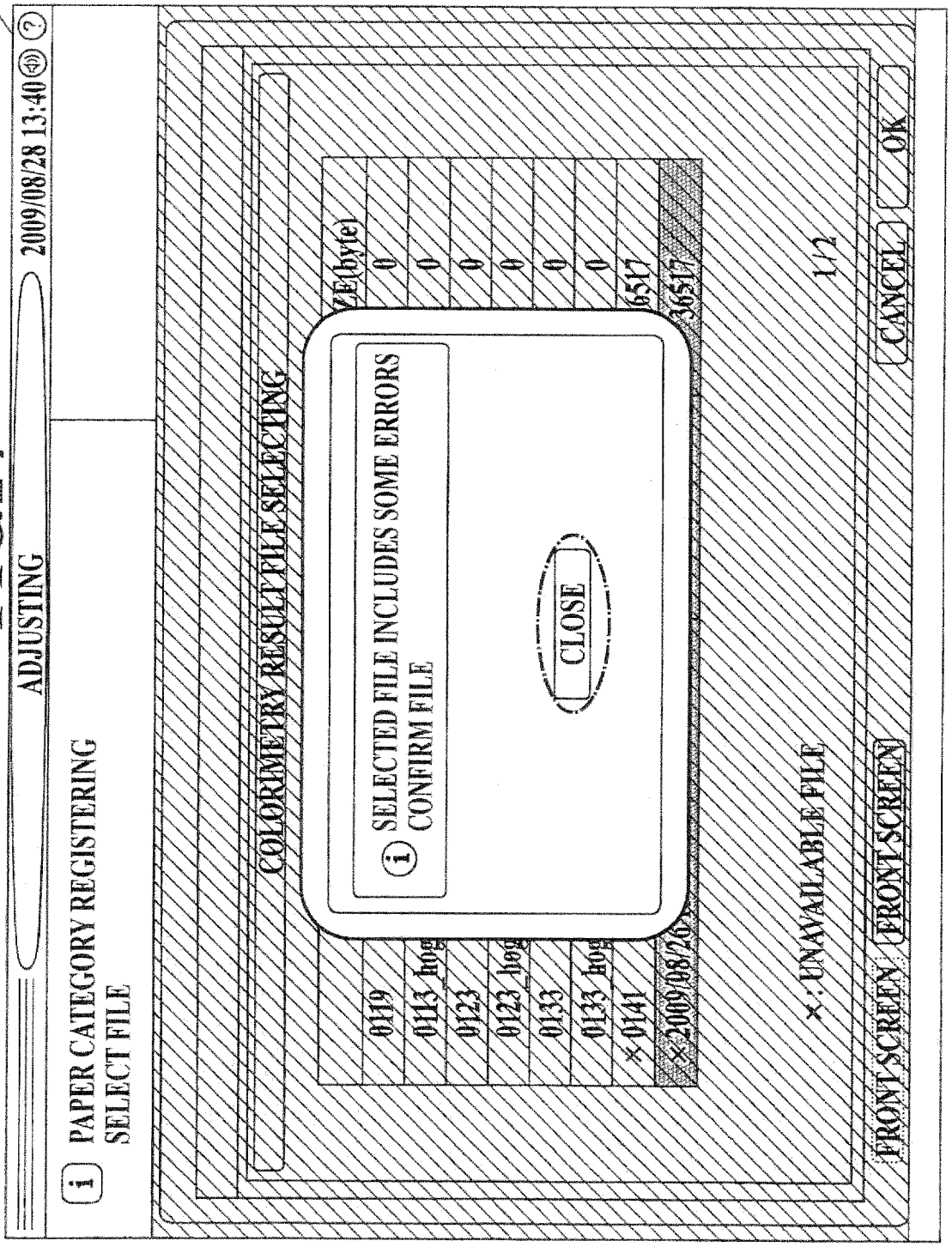
FIG. 24 is a view showing a screen in the case where the registration of a file of colorimetry results could not be performed.

FIG. 24 shows a screen G22 in the case where no density conversion data has been registered.

The screen G22 is one to be displayed when a suitable file has not been selected and the "OK" button has been depressed on the file selecting screen G20. A message of urging a user to perform the reconfirmation of the selected file is displayed on the screen G22.

[Link Releasing Processing]

Figure 25:
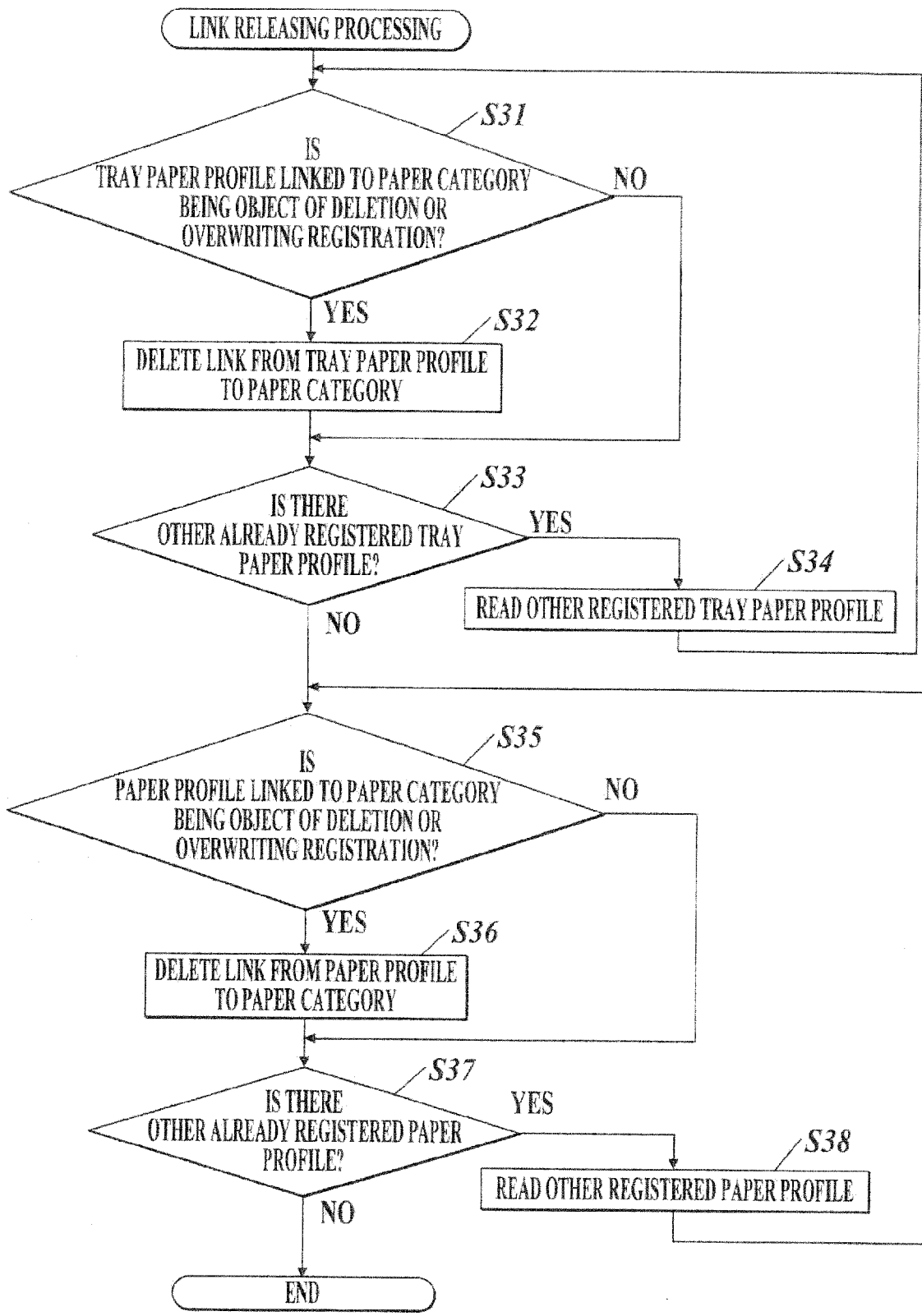
FIG. 25 is a flow chart showing link releasing processing.

Link releasing processing will be described with reference to FIG. 25.

The link releasing processing is executed by the image controlling CPU 101 in cooperation with a program stored in the storage section 102.

Incidentally, the tray paper profiles or the paper profiles are linked with the paper categories as it has been described with reference to FIG. 11. If any paper category among the paper categories of Nos. 1-10 is deleted or is subjected to overwriting registration, it is necessary to delete the link setting of the linked tray paper profile or the linked paper profile at the time of the deletion or the overwriting registration of the paper category.

The image controlling CPU 101 judges whether a tray paper profile is linked with the paper category of the object of deletion or overwriting registration or not (Step S31).

If the tray paper profile is linked with the paper category (Step S31: YES), the image controlling CPU 101 deletes the link setting from the tray paper profile to the paper category (Step S32), and moves the processing to that at Step S33.

If the tray paper profile is not linked with the paper category (Step S31: NO), the image controlling CPU 101 moves the processing to that at Step S33.

The image controlling CPU 101 judges whether there is another already registered tray paper profile or not (Step S33).

If there is another already registered tray paper profile (Step S33: YES), the image controlling CPU 101 reads the other registered tray paper profile therein (Step S34), and moves the processing to that at Step S31.

If there is no another already registered tray paper profile (Step S33: NO), the image controlling CPU 101 moves the processing to that at Step S35.

The image controlling CPU 101 judges whether a paper profile is linked with the paper category of the object of deletion or overwriting registration or not (Step S35).

If the paper profile is linked with the paper category (Step S35: YES), the image controlling CPU 101 deletes the link setting from the paper profile to the paper category (Step S36), and moves the processing to that at Step S37.

If the paper profile is not linked with the paper category (Step S35: NO), the image controlling CPU 101 moves the processing to that at Step S37.

The image controlling CPU 101 judges whether there is another already registered paper profile or not (Step S37).

If there is another already registered paper profile (Step S37: YES), the image controlling CPU 101 reads the other registered paper profile therein (Step S38), and moves the processing to that at Step S35.

If there is no another already registered paper profile (Step S37: NO), the image controlling CPU 101 ends the link releasing processing.

[Link Setting Processing of Tray Paper Profile]

Figure 26:
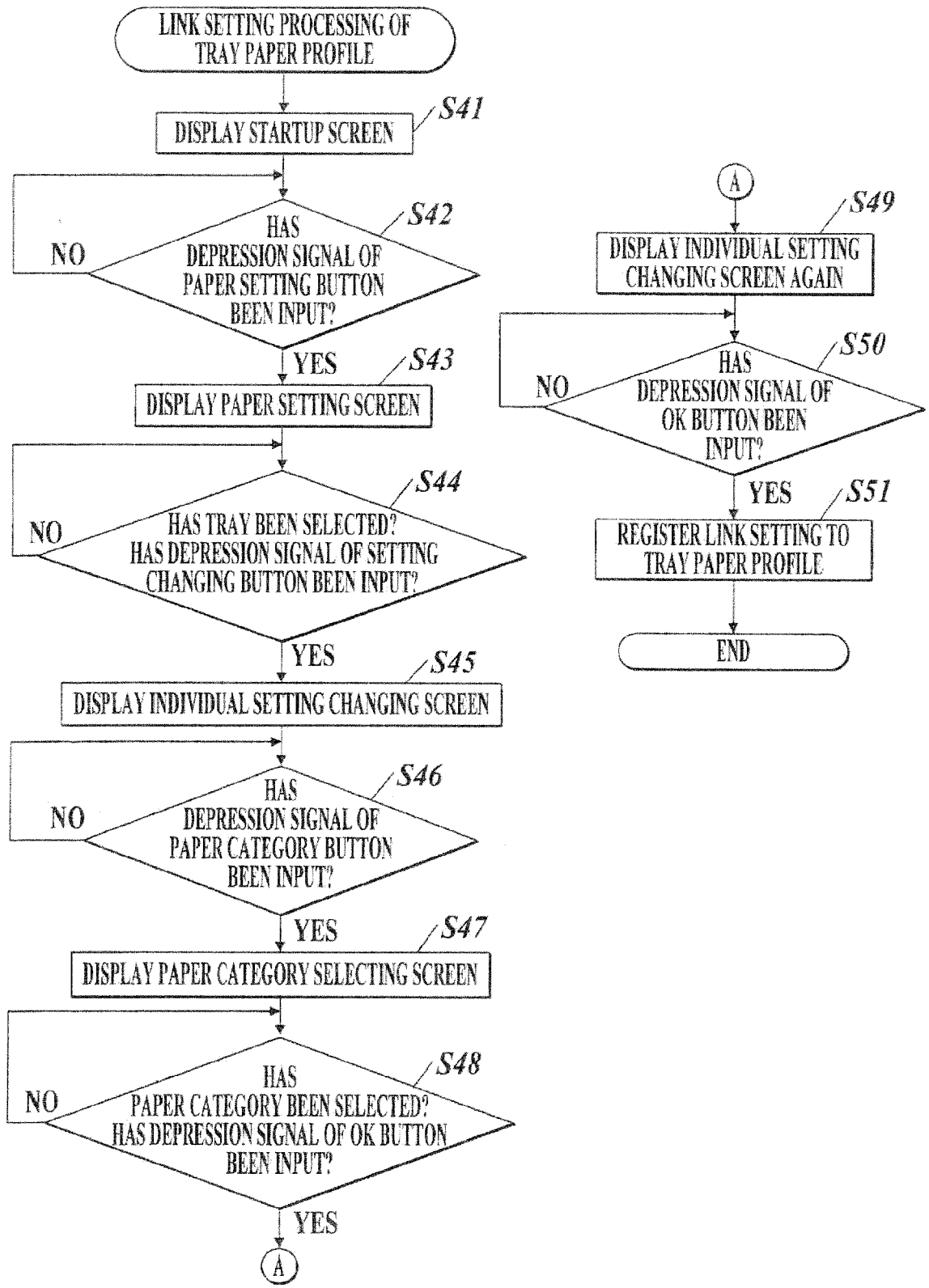
FIG. 26 is a flow chart showing the link setting processing of a tray paper profile.

Link setting processing of the tray paper profile will be described with reference to FIG. 26.

The link setting processing of the tray paper profile is executed by the image controlling CPU 101 in cooperation with a program stored in the storage section 102. By the execution of the link setting processing of the tray paper profile, a paper setting section is realized, and paper categories can be correlated with tray paper profiles.

First, the image controlling CPU 101 displays a startup screen in the operation displaying section 14 (Step S41).

Figure 27:
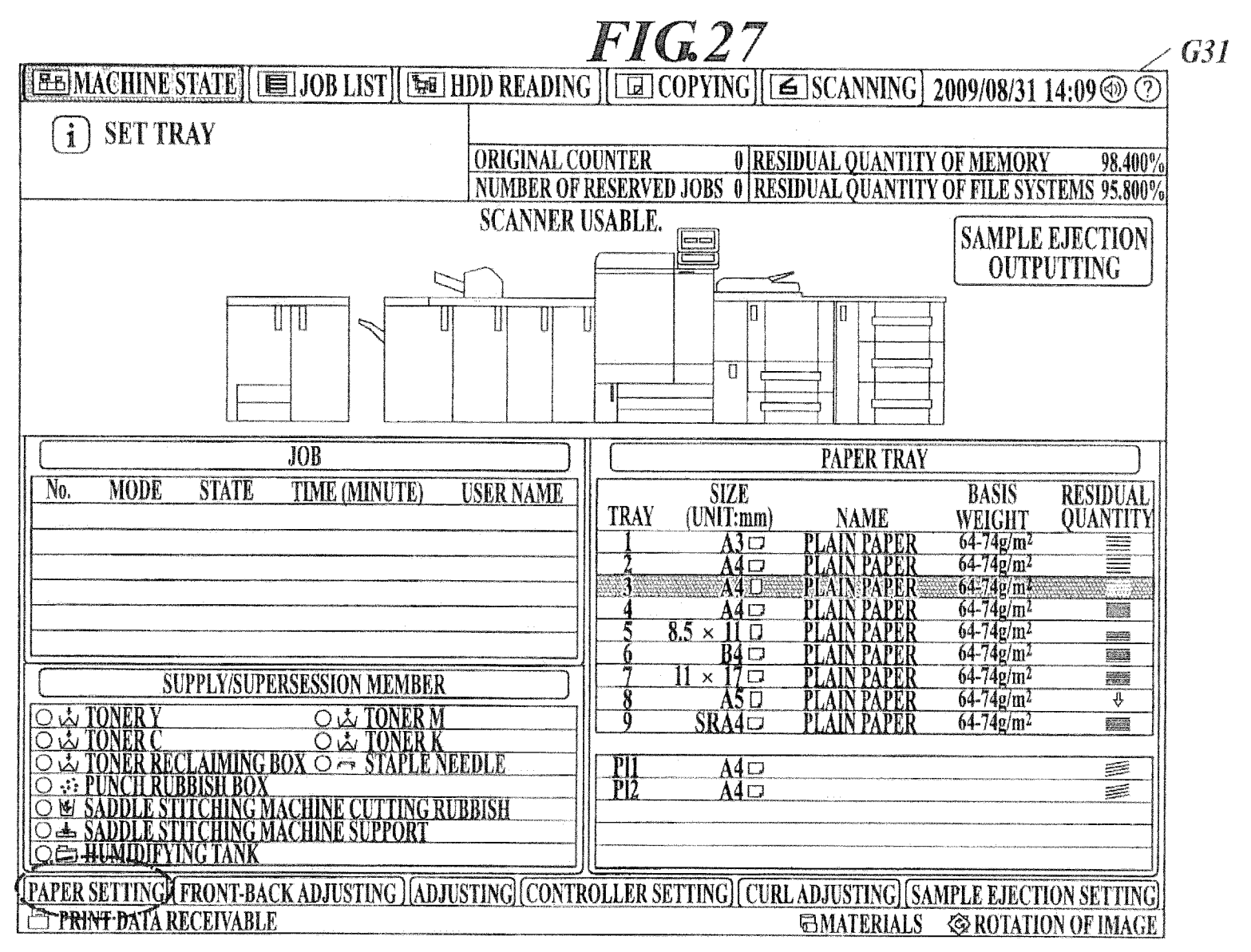

FIG. 27 shows the startup screen G31.

The configuration and the contents of the startup screen G31 are the same as those of the startup screen G11 (see FIG.

13). A "paper setting" button is displayed on the lower left side of the startup screen G31 in the state of being depressible.

The image controlling CPU 101 judges whether or not the image controlling CPU 101 has received the input of a depression signal that has been generated when the "paper setting" button has been depressed on the startup screen G31 (Step S42).

If the image controlling CPU 101 has not received the input of the depression signal of the "paper setting" button (Step S42: NO), the image controlling CPU 101 continues to display the startup screen G31.

If the image controlling CPU 101 has received the input of the depression signal of the "paper setting" button (Step S42: YES), the image controlling CPU 101 displays a paper setting screen in the operation displaying section 14 (Step S43).

Figure 28:
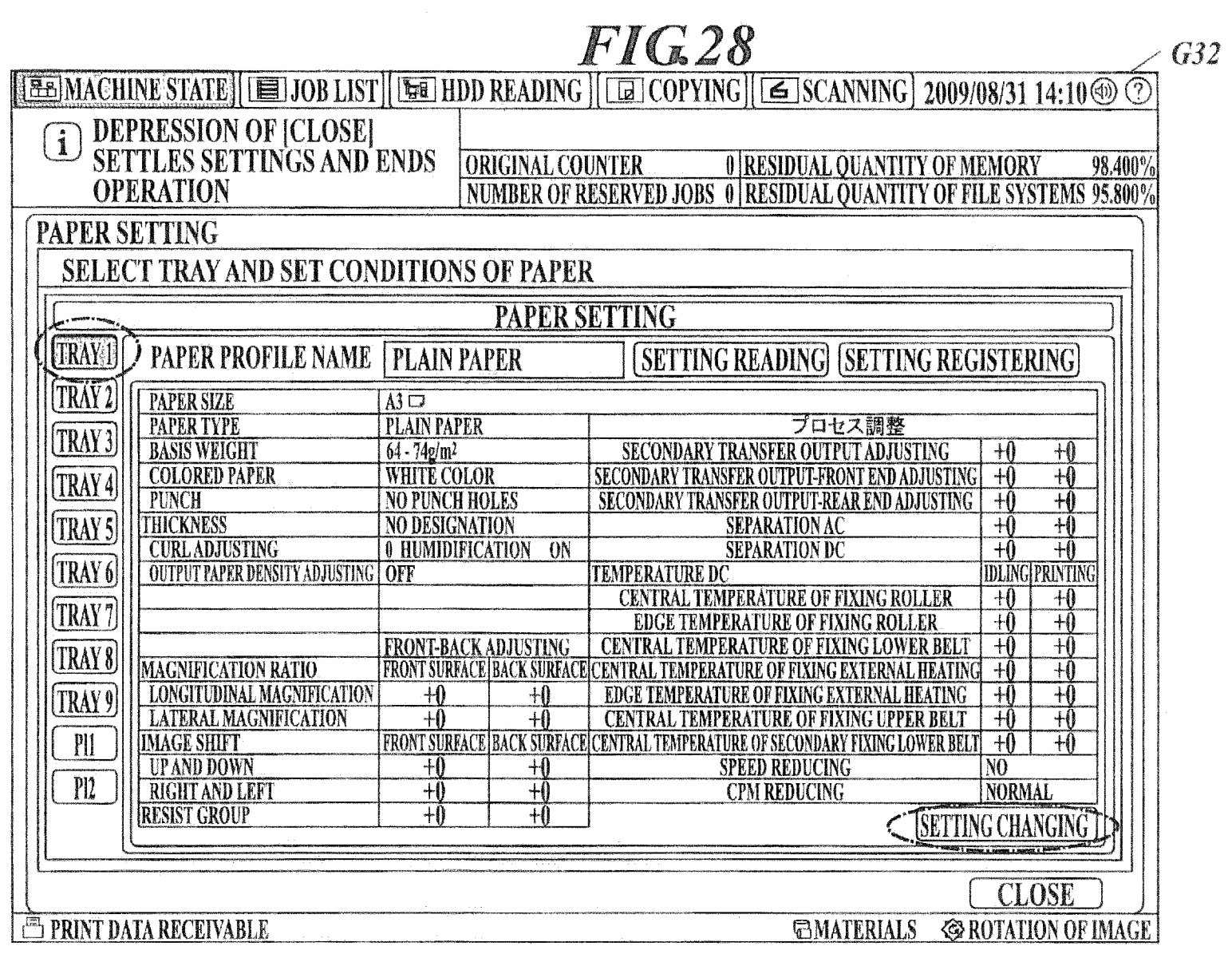

FIG. 28 shows the paper setting screen G32.

9 "tray" buttons of trays 1-9 are displayed in total on the left side of the screen G32 in the state of being selectable. Moreover, a "setting changing" button is displayed on the lower right side of the screen G32 in the state of being depressible.

The image controlling CPU 101 judges whether or not the image controlling CPU 101 has received the input of a depression signal that has been generated when any tray has been selected among the trays 1-9 and the "setting changing" button has been depressed on the paper setting screen G32 (Step S44).

If the image controlling CPU 101 has not received the input of the depression signal of the "setting changing" button (Step S44: NO), the image controlling CPU 101 continues to display the paper setting screen G32.

If the image controlling CPU 101 has received the input of the depression signal of the "setting changing" button (Step S44: YES), the image controlling CPU 101 displays an individual setting changing screen in the operation displaying section 14 (Step S45).

FIG. 29 shows the individual setting changing screen G33.

An "output paper density adjusting" button is displayed on the left side of the individual setting changing screen G33 in the state of being depressible. Moreover, when the "output paper density adjusting" button is in the state of being depressed, a "default correcting value" button, a "paper category" button, and an "OFF" button are displayed on the right side of the screen G33.

Here, although the processing when the "output paper density adjusting" button and the "paper category" button are depressed on the individual setting changing screen G33 will be described in the present processing for performing the link setting of a paper category with a tray paper profile, it is also possible to adopt the setting of using simple density conversion data using a predetermined default correction value or the setting of turning off the output paper density adjusting function and using the IDC sensor 12h (22h) to perform printer γ correction. These settings are registered as the "printer γ correction mode" of the tray paper profile of the nonvolatile memory 102c. A user can sets the output paper density adjusting according to the accuracy required at the time of performing image formation and the use thereof.

Moreover, if a user depresses the button of another item (for example, the button of the paper type, the paper size, the basis weight, or the like) on the individual setting changing screen G33, the user can input or change the content of the item.

The image controlling CPU 101 judges whether or not the image controlling CPU 101 has received the input of a depression signal that has been generated when the "paper category" button has been depressed on the individual setting changing screen G33 (Step S46).

If the image controlling CPU 101 has not received the input of the depression signal of the "paper category" button (Step S46: NO), the image controlling CPU 101 continues to display the individual setting changing screen G33.

If the image controlling CPU 101 has received the input of the depression signal of the "paper category" button (Step S46: YES), the image controlling CPU 101 displays a paper category selecting screen in the operation displaying section 14 (Step S45).

FIG. 30 shows the paper category selecting screen G34.

The configuration and the contents of the paper category selecting screen G34 are the same as those of the list selecting screen G21 (see FIG. 23). Paper categories are displayed at the center of the screen G34 in the state of being selectable. Moreover, an "OK" button is displayed on the lower side of the screen G34 in the state of being depressible.

The image controlling CPU 101 judges whether or not the image controlling CPU 101 has received the input of a depression signal that has been generated when a paper category has been selected and the "OK" button has been depressed on the paper category selecting screen G34 (Step S48).

If the image controlling CPU 101 has not received the input of the depression signal of the "OK" button (Step S48: NO), the image controlling CPU 101 continues to display the paper category selecting screen G34.

If the image controlling CPU 101 has received the input of the depression signal of the "OK" button (Step S48: YES), the image controlling CPU 101 displays the individual setting changing screen G33 in the operation displaying section 14 again (Step S49).

Figure 31:
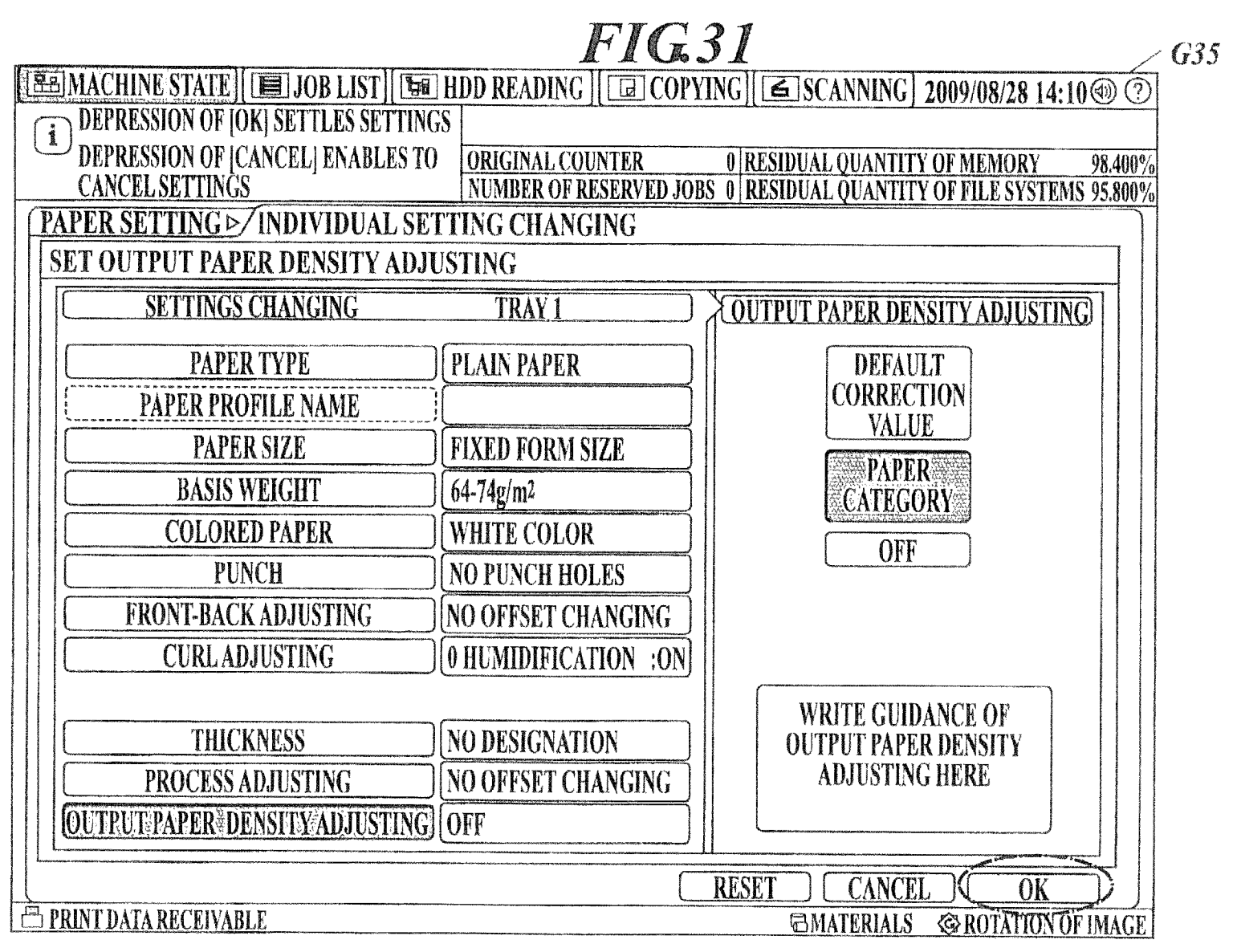

FIG. 31 shows the individual setting changing screen G35 displayed again.

The configuration and the contents of the individual setting changing screen G35 displayed again are the same as those of the individual setting changing screen G33 (see FIG. 29). The "output paper density adjusting" button and the "paper category" button are displayed on the individual setting changing screen G35 in the state of being depressed. Moreover, the "OK" button is displayed on the lower side of the screen G35 in the state of being depressible.

The image controlling CPU 101 judges whether or not the image controlling CPU 101 has received the input of a depression signal that has been generated when the "OK" button has been depressed on the individual setting changing screen G35 (Step S50).

If the image controlling CPU 101 has not received the input of the depression signal of the "OK" button (Step S50: NO), the image controlling CPU 101 continues to display the individual setting changing screen G35.

If the image controlling CPU 101 has received the input of the depression signal of the "OK" button (Step S50: YES), the image controlling CPU 101 sets the "printer γ correction mode" of the tray paper profile of the tray selected on the paper setting screen G32 to the "paper category" in the tray paper profile storing area A13 of the nonvolatile memory 102c, and registers the registration No. of the selected paper category into the "link of paper category database" of the selected tray paper profile in order that the tray paper profile may be linked with the paper category selected on the paper category selecting screen G34 (Step S51). Then, the image controlling CPU 101 ends the link setting processing of the tray paper profile.

[Paper Profile Registering Processing]

Figure 32:
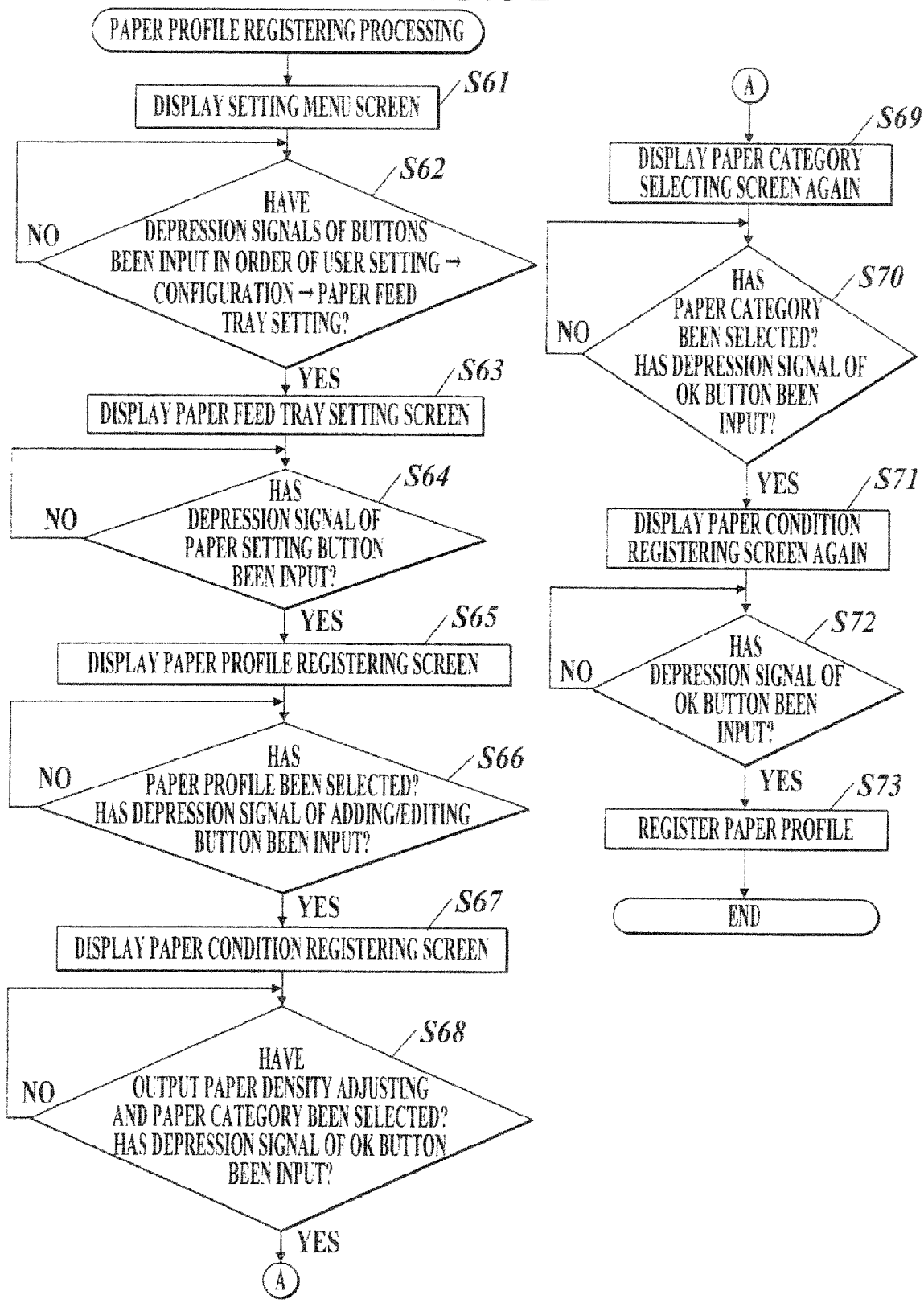
FIG. 32 is a flow chart showing paper profile registering processing.

Paper profile registering processing will be described with reference to FIG. 32.

The paper profile registering processing is executed by the image controlling CPU 101 in cooperation with a program stored in the storage section 102. By the paper profile registering processing, a paper setting section is realized, and a paper category can be correlated with a paper profile. Moreover, a maximum of 500 paper profiles can previously be registered.

First, the image controlling CPU 101 displays a setting menu screen in the operation displaying section 14 (Step S61).

FIG. 33 shows the setting menu screen G41.

A "user setting" button is displayed on the right side of the screen G41 in the state of being depressible.

The image controlling CPU 101 judges whether or not the image controlling CPU 101 has received the input of a depression signal that has been generated when the "user setting" button has been depressed on the setting menu screen G41, and whether or not the image controlling CPU 101 has successively received the input of the depression signals of the "configuration" button and the "paper feed tray setting" button in the order (Step S62).

If the image controlling CPU 101 has not received the input of the last depression signal of the "paper feed tray setting" button (Step S62: NO), the image controlling CPU 101 continues to display the setting menu screen G41.

If the image controlling CPU 101 has received the input of the last depression signal of the "paper feed tray setting" button (Step S62: YES), the image controlling CPU 101 displays a paper feed tray setting screen (Step S63).

FIG. 34 shows the paper feed tray setting screen G42.

The state that has started from a setting menu and has changed to paper feed tray setting through user setting and configuration is displayed on the left side of the screen G42. Moreover, a "paper setting" button is displayed on the right side of the screen G42 in the state of being depressible.

The image controlling CPU 101 judges whether or not the image controlling CPU 101 has received the input of a depression signal that has generated when the "paper setting" button has been depressed on the paper feed tray setting screen G42 (Step S64).

If the image controlling CPU 101 has not received the input of the depression signal of the "paper setting" button (Step S64: NO), the image controlling CPU 101 continues to display the paper feed tray setting screen G42.

If the image controlling CPU 101 has received the input of the depression signal of the "paper setting" button (Step S64: YES), the image controlling CPU 101 displays a paper profile registering screen in the operation displaying section 14 (Step S65).

FIG. 35 shows the paper profile registering screen G43.

500 paper profiles of Nos. 1-500 are displayed in total at the center of the screen G43 in the state of being selectable. Moreover, an "adding/editing" button is displayed on the lower side of the screen G43 in the state of being depressible.

The image controlling CPU 101 judges whether or not the image controlling CPU 101 has received the input of a depression signal that has been generated when a paper profile has been selected and the "adding/editing" button has been depressed on the paper profile registering screen G43 (Step S66).

If the image controlling CPU 101 has not received the input of the depression signal of the "adding/editing" button (Step S66: NO), the image controlling CPU 101 continues to display the paper profile registering screen G43.

If the image controlling CPU 101 has received the input of the depression signal of the "adding/editing" button (Step S66: YES), the image controlling CPU 101 displays a paper condition registering screen in the operation displaying section 14 (Step S67).

FIG. 36 shows the paper condition registering screen G44.

An "output paper density adjusting" button is displayed on the left side of the paper condition registering screen G44 in the state of being depressible. Moreover, a "default correcting value" button, a "paper category" button and an "OFF" button are displayed on the right side of the screen G44 in the state of being depressible when the "output paper density adjusting" button is in a depressed state.

Similarly to the aforesaid case at the time of the aforesaid setting to a tray paper profile, the processing of the case where the "output paper density adjusting" button and the "paper category" button are depressed on the paper condition registering screen G44 will be described here, but it is also possible to adopt the setting of using predetermined default density conversion data, or the setting of turning off the output paper density adjusting function and of using the IDC sensor 12$h$ (22$h$) to perform printer γ correction. These settings are registered as the "printer γ correction mode" of a paper profile of the nonvolatile memory 102$c$. A user can set the output paper density adjusting according to the accuracy required for image formation and the use thereof.

Moreover, when the buttons of the other items (for example, the "paper type" button, the "paper size" button, the "basis weight" button, and the like) are depressed on the paper condition registering screen G44, it is possible to perform the inputs and the changes of these items.

The image controlling CPU 101 judges whether or not the image controlling CPU 101 has received the input of a depression signal that has been generated when the "output paper density adjusting" button and the "paper category" button have been selected and the "OK" button has been depressed on the paper condition registering screen G44 (Step S68).

If the image controlling CPU 101 has not received the input of the depression signal of the "OK" button (Step S68: NO), the image controlling CPU 101 continues to display the paper condition registering screen G44.

If the image controlling CPU 101 has received the input of the depression signal of the "OK" button (Step S68: YES), the image controlling CPU 101 displays the paper category selecting screen again in the operation displaying section 14 (Step S69).

FIG. 37 shows the paper category selecting screen G45.

The configuration and the contents of the paper category selecting screen G45 are the same as those of the paper category selecting screen G34 (see FIG. 30). Paper categories are displayed at the center of the screen G34 in the state of being selectable. The paper categories displayed here are those that a user has previously registered. Moreover, an "OK" button is displayed on the lower side of the screen G45 in the state of being depressible.

The image controlling CPU 101 judges whether or not the image controlling CPU 101 has received the input of a depression signal that has been generated when a paper category has been selected and the "OK" button has been depressed on the paper category selecting screen G45 (Step S70).

If the image controlling CPU 101 has not received the input of the depression signal of the "OK" button (Step S70: NO), the image controlling CPU 101 continues to display the paper category selecting screen G45.

If the image controlling CPU 101 has received the input of the depression signal of the "OK" button (Step S70: YES), the image controlling CPU 101 displays the paper condition registering screen G44 again in the operation displaying section 14 (Step S71).

FIG. 38 shows the paper condition registering screen G46 displayed again.

The configuration and the contents of the paper condition registering screen G46 displayed again are the same as those of the paper condition registering screen G44 (see FIG. 36). An "output paper density adjusting" button and a "paper category" button are displayed on the paper condition registering screen G46 in the state of being depressed. Moreover, an "OK" button is displayed on the lower side of the screen G46 in the state of being depressible.

The image controlling CPU 101 judges whether or not the image controlling CPU 101 has received the input of a depression signal that has been generated when the "OK" button has been depressed on the paper condition registering screen G46 (Step S72).

If the image controlling CPU 101 has not received the input of the depression signal of the "OK" button (Step S72: NO), the image controlling CPU 101 continues to display the paper condition registering screen G46.

If the image controlling CPU 101 has received the input of the depression signal of the "OK" button (Step S72: YES), the image controlling CPU 101 sets the printer γ correction mode of the paper profile selected on the paper profile registering screen G43 to the "paper category" in the paper profile storing area A 14 of the nonvolatile memory 102c, and registers the registration No. of the paper category selected on the paper category selecting screen G45 to the "link of the database to the paper category" in order that the paper profile may be linked to the one selected on the paper category selecting screen G45 (Step S73). The image controlling CPU 101 ends the paper profile registering processing.

[Modification]

Although the case of making the settings of the output paper density adjusting equal in all the image forming apparatus 1 and 2 connected to the image forming system 100 has been exemplified to be described in the aforesaid description, the configuration for enabling each of the image forming apparatus 1 and 2 to perform the individual setting of output paper density adjusting as shown in the following modification may be adopted.

In the case where the configuration of performing the setting of the output paper density adjusting of each of the image forming apparatus 1 and 2 individually, the tray paper profiles to be stored in the tray paper profile storing area A13 are led to have the structure shown in FIG. 39. That is, the printer γ correction mode and the link information to paper category of each of the image forming apparatus 1 and 2 are stored in the printer γ correction mode and the link of paper category database, respectively. The paper profile to be stored in the paper profile storing area A14 is also led to have a similar structure. The other configurations are the same as those described above.

Moreover, the control of the image controlling CPU 101 is different from that of the embodiment in the following points.

In the modification, when the "output paper density adjusting" button has been selected on the individual setting changing screen G33 displayed at Step S45 of the aforesaid link setting processing of the tray paper profile and on the paper condition registering screen G44 displayed at Step S67 of the paper profile registering processing, the image controlling CPU 101 displays a "default correcting value" button, a "paper category" button, an "OFF" button to each of the image forming apparatus 1 and 2 (on the master side and on the slave side, here) connected to the image forming system 100 as shown in FIG. 40. Thereby, a user can perform the setting of the output paper density adjusting individually to each of the image forming apparatus 1 and 2. When the "paper category" button is depressed to either of the image forming apparatus 1 and 2, the image controlling CPU 101 displays the paper category selecting screen in the operation displaying section 14. The user can select a paper category individually to the image forming apparatus the "paper category" button of which the user has depressed. After the ends of the setting of the output paper density adjusting to all of the image forming apparatus 1 and 2 and the selection of a paper category to the image forming apparatus the "paper category" button of which the user has depressed, and then after the depression of the "OK" button on the individual setting changing screen G35 or one the paper condition registering screen G44, the image controlling CPU 101 sets the output paper density adjusting of each of the image forming apparatus 1 and 2 to the tray paper profile or the paper profile thereof. That is, the image controlling CPU 101 registers the output paper density adjusting of each of the image forming apparatus 1 and 2 to the "printer γ correction mode" of the selected tray paper profile or the selected paper profile that is stored in the nonvolatile memory 102c, and registers the registration No. of the selected paper category to the "link of paper category database" to the image forming apparatus the "paper category" of which has been selected as the setting of the output paper density adjusting. According to the modification, a user can perform the optimum printer γ correction according to the use of each of the image forming apparatus 1 and 2.

The image controlling CPU 101 executes γ correcting table producing processing at predetermined timings, such as the timing of a startup of the image forming system 100 and the timing of the end of the registration processing of density conversion data, and the image controlling CPU 101 makes the image controlling CPU of each of the image forming apparatus 1 and 2, that is, the image controlling CPU 101 of the first image forming apparatus 1 and the image controlling CPU 201 of the second image forming apparatus 2 here, produce a density conversion table or a density conversion function (a table or a function for converting a voltage value into a density value such as X, Y, and Z tristimulus values) corresponding to each paper category in conformity with a predetermined algorithm on the basis of the voltage value and the density value of each paper category stored in the paper category storing area of the nonvolatile memory 102c (202c) of each of the image forming apparatus 1 and 2. Then, the image controlling CPU 101 makes the image controlling CPUs 101 and 201 produce printer γ correction tables by using the produced density conversion tables or the produced density conversion functions. The produced density conversion tables or the produced density conversion functions, and the produced printer γ correction tables are stored in the RAMs 102 and 202 or the like in the state of being associated with the register Nos. of the paper categories.

Moreover, the image controlling CPU 101 obtains the information of the paper category of the tray paper profile corresponding to the tray designated in a job (designated by a user) at the time of starting the execution of the image forming job, and informs the image controlling CPUs 101 and 201 of the image forming apparatus 1 and 2, respectively, of the obtained No. of the paper category. If a user has not designated a tray but has designated a paper type or a certain paper profile, the image controlling CPU 101 updates the tray paper profile of the paper feed tray loaded with the sheets of paper corresponding to the designated paper type or the designated paper profile to the content of the paper profile of the paper, and informs the image controlling CPUs 101 and 201 of the image forming apparatus 1 and 2, respectively, of the No. of the paper category linked with the updated tray paper profile.

The image controlling CPUs 101 and 201 of the image forming apparatus 1 and 2, respectively, perform printer γ correction on the basis of the printer γ correction table corresponding to the informed paper category which printer γ correction table is stored in the RAM or the like.

In such a way, the image controlling CPU 101 realizes a correction controlling section which makes each of the image forming apparatus 1 and 2 produce a density conversion table or a density conversion function based on the paper categories stored in the nonvolatile memories 102c and 202c of the image forming apparatus 1 and 2, respectively, at predetermined timings, which correction controlling section makes each of the image forming apparatus 1 and 2 perform printer γ correction on the basis of the produced density conversion table or the produced density conversion function at the time of image formation.

As described above, according to the present embodiment, a user can previously store color space coordinate value converting information (X, Y, and Z tristimulus value converting table) into the nonvolatile memory 102c by classifying the information to each of the actually using types of paper. Incidentally, the color space coordinate value converting information (X, Y, and Z tristimulus value converting table) is generated on the basis of the information of the voltage value input from the color sensor 32 and the information of the color space coordinate values (X, Y, and Z tristimulus values) obtained by the colorimetry using the color space coordinate value colorimeter (X, Y, and Z tristimulus value colorimeter 5). A user can accordingly perform the optimum printer γ correction to a sheet of paper to be actually used by a simple operation.

As described above, according to the image forming system 100, the image controlling CPU 101 of the first image forming apparatus 1 on the master side executes the registration processing of density conversion data, and thereby obtains a voltage value of a colorimetry result, by the color sensor 32, of a density correcting chart formed as an image in each of the first and the second image forming apparatus 1 and 2 and a density value of a colorimetry result by the X, Y, and Z tristimulus value colorimeter 5. The image controlling CPU 101 stores the density conversion data that is the combinations of the obtained voltage values and the density values into the nonvolatile memories 102c and 202c of the mage forming apparatus 1 and 2, respectably, which apparatus 1 and 2 have formed the density correcting charts used for the colorimetry.

Moreover, the image controlling CPU 101 correlates (links) a tray paper profile with at least one or more pieces of density conversion data to store the tray paper profile into the nonvolatile memory 102c in the link setting processing of the tray paper profile. Alternatively, the image controlling CPU 101 correlates a paper profile with at least one or more pieces of density conversion data to store the paper profile into the nonvolatile memory 102c in the paper profile registering processing.

Then, the image controlling CPU 101 makes each of the first and the second image forming apparatus 1 and 2 produce a density conversion table or a density conversion function for converting a voltage value into a density value on the basis of the density conversion data stored in the respective nonvolatile memories 102c and 202c at a predetermined timing such as the timing of power activation or the timing after the registration processing of the density conversion data, and the image controlling CPU 101 makes each of the first and the second image forming apparatus 1 and 2 perform printer γ correction at the time of image formation on the basis of the density conversion table or the density conversion function that have been produced by using the density conversion data correlated with the paper profile of the sheet of paper to be used for the image formation or the tray paper profile of the paper feed tray loaded with the paper.

Consequently, because each of the image forming apparatus 1 and 2 automatically produces the density conversion table or the density conversion function on the basis of the density conversion data correlated with the tray or the sheet of paper that is used for image formation and performs the printer γ correction on the basis of the produced density conversion table or the produced density conversion function, the operation of selecting an output gradation characteristic in each of the image forming apparatus 1 and 2 at the time of image formation, which operation has conventionally been needed, becomes unnecessary at the time of performing the printer γ correction according to the sheet of output paper, and the troublesomeness of the setting operations at the time of performing printer γ correction can be removed.

Moreover, it becomes possible to perform the optimum γ correction according to the use of each of the image forming apparatus 1 and 2 by adopting the configuration of storing the density conversion data of each of the image forming apparatus 1 and 2 into the nonvolatile memory 102c to be associated with the tray paper profile or the paper profile thereof. For example, it becomes possible to use any of the pieces of density conversion data registered by the registration processing of density conversion data for an image forming apparatus requiring the high accuracy of image reproduction to the tray paper profile or the paper profile, and to use an IDC sensor the adjusting of which is easy for an image forming apparatus for the use of requiring not so much accuracy.

Moreover, if each of the plurality of image forming apparatus 1 and 2 is configured as follows, it becomes possible to automatically collectively correlate the pieces of density conversion data obtained by using the same type of sheets of paper with each of the image forming apparatus 1 and 2: in the registration processing of the density conversion data, by making each of the plurality of image forming apparatus 1 and 2 form γ correcting charts by using the same type of sheets of paper; after the obtainment of the density conversion data of all of the plurality of image forming apparatus 1 and 2, giving a registration No. to each piece of the obtained density conversion data which No. indicates that the density conversion data is that of a set of pieces of density conversion data obtained by using the same type sheets of paper, and storing the density conversion data in the nonvolatile memories 102c and 202c of the image forming apparatus 1 and 2, respectively; and then collectively correlating the registration Nos. of the density conversion data at the time of performing the correlation of the density conversion data with tray paper profiles or paper profiles.

Incidentally, the description of the aforesaid embodiment shows a suitable example of the image forming system according to the present invention, and the scope of the present invention is not limited to this embodiment.

For example, the image forming system of the present invention is not limited to the one in which the first image forming apparatus 1, the second image forming apparatus 2, the RU 3, the post-processing apparatus 4, and the like are independently configured to be connected to one another, but the image forming system may be the one composed of integrally configured components.

Moreover, although the aforesaid embodiment is configured in such a way that the first image forming apparatus 1 is equipped with the USB port 17 as a taking-in section to taking a colorimetry result of the X, Y, and Z tristimulus value colorimeter 5 therein, the USB port 17 may be equipped by either of the image forming apparatus 1 and 2.

Moreover, although the correlation of the density conversion data is performed to both of a tray paper profile and a paper profile in the aforesaid embodiment, the configuration of performing the correlation to only either of them may be adopted.

Moreover, although the aforesaid description discloses an example of using the ROMs 102a and 202a, the nonvolatile memories 102c and 202c, hard disks, and the like as the computer-readable media of the programs according to the present invention, the present invention is not limited to this example. A portable type recording medium, such as a compact disc read only memory (CD-ROM), can be applied to the present invention as another computer-readable medium. Moreover, a carrier wave can also be applied to the present invention as a medium for proving the data of a program according to the present invention through a communication line.

The other minute configurations and minute operations of the image forming system 100 can also suitably be changed without departing from the scope and sprit of the present invention.

The entire disclosure of Japanese Patent Application No. 2010-252406 filed on Nov. 11, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image forming system, comprising:
a plurality of image forming apparatus for forming an image on a sheet of paper, each of the plurality of image forming apparatus having a storage section and being connected with each other in a paper conveying direction;
a color sensor for performing colorimetry on a density correcting chart formed on the sheet of paper by one of the plurality of image forming apparatus to output a voltage value as a colorimetry result;
a taking-in section for taking in a density value as a colorimetry result of colorimetry performed by an external colorimeter on the density correcting chart;
a plurality of paper feed trays;
a density conversion data registering section for obtaining density conversion data composed of a combination of the voltage value and the density value based on the respective colorimetry results of the color sensor and the taking-in section, and storing the density conversion data into the storage section included in the image forming apparatus which forms the density correcting chart to be used for the colorimetry;
a paper setting section for storing a tray paper profile representing set information of paper which is set in each of the paper feed trays, or a paper profile representing set information of each of the paper to be used in the image forming system, into a paper setting storage section, the tray paper profile or the paper profile being correlated with at least one piece of the density conversion data obtained by the density conversion data registering section; and
a correction controlling section for making the plurality of image forming apparatus produce a density conversion table or a density conversion function for converting, at the respective plurality of image forming apparatus, the voltage value into the density value based on the density conversion data stored in the storage section included in the plurality of image forming apparatus, respectively, and making the plurality of image forming apparatus perform printer γ (gamma) correction based on the density conversion table or the density conversion function produced by using the density conversion data correlated with the paper profile of the paper to be used for the image formation or the tray paper profile of the paper feed tray loaded with the paper, the paper profile and the tray paper profile being stored in the paper setting storage section, at a time of the image formation.

2. The image forming system according to claim 1, wherein the paper setting section makes the paper setting storage section store the density conversion data of the plurality of image forming apparatus, respectively, in a state of being correlated with the tray paper profile or the paper profile.

3. The image forming system according to claim 2, wherein
the storage section of each of the image forming apparatus further stores predetermined density conversion data and density conversion data generated based on a voltage value from an IDC (image density control) sensor, and
the paper setting section makes each of the paper setting storage sections store therein the tray paper profile or the paper profile, the tray paper profile or the paper profile being correlated with any of, any piece of the density conversion data obtained by the density conversion data registering section, the predetermined density conversion data, and the density conversion data based on the IDC sensor.

4. The image forming system according to claim 1,
wherein the density conversion data registering section makes each of the plurality of image forming apparatus form the density correcting chart by using same type of paper and obtains the density conversion data as to all of the plurality of image forming apparatus,
wherein the density conversion data registering section gives identification information to each piece of the obtained density conversion data, the identification information indicating that the density conversion data is a set of data obtained by using the same type of paper,
wherein the density conversion data registering section makes the storage section of each of the image forming apparatus store the density conversion data with the identification information, and
wherein the paper setting section makes the paper setting storage section store the identification information of the set of pieces of density conversion data in a state of being correlated with the tray paper profile or the paper profile.

* * * * *